(12) United States Patent
Lee et al.

(10) Patent No.: US 11,290,054 B2
(45) Date of Patent: Mar. 29, 2022

(54) FLOATING PHOTOVOLTAIC PANEL INSTALLATION STRUCTURE AND BUOYANCY BODY FOR INSTALLATION OF FLOATING PHOTOVOLTAIC PANEL

(71) Applicant: SEMI LED CO., LTD., Jeonju-si (KR)

(72) Inventors: Hyo Lee, Jeonju-si (KR); Young Choul Park, Iksan-si (KR); Noh Joon Park, Jeonju-si (KR); Kang Hwa Lee, Jeonju-si (KR)

(73) Assignee: SEMI LED CO., LTD., Jeonju-si (KR)

( * ) Notice: Subject to any disclaimer, the term of this patent is extended or adjusted under 35 U.S.C. 154(b) by 0 days.

(21) Appl. No.: 16/662,052

(22) Filed: Oct. 24, 2019

(65) Prior Publication Data
US 2021/0036653 A1 Feb. 4, 2021

(30) Foreign Application Priority Data
Aug. 2, 2019 (KR) .................. 10-2019-0094437

(51) Int. Cl.
*H02S 20/30* (2014.01)
*B63B 35/44* (2006.01)

(52) U.S. Cl.
CPC ............ *H02S 20/30* (2014.12); *B63B 35/44* (2013.01); *B63B 2035/4453* (2013.01)

(58) Field of Classification Search
CPC .. H02S 20/30; B63B 35/44; B63B 2035/4453
See application file for complete search history.

(56) References Cited

U.S. PATENT DOCUMENTS

2018/0022426 A1\* 1/2018 Siegmann ............... B63B 35/44
  114/264
2019/0134822 A1\* 5/2019 Clemenzi ................ H02S 99/00
(Continued)

FOREIGN PATENT DOCUMENTS

JP      2016-124402 A      7/2016
JP    WO2018221494     \* 12/2018
(Continued)

OTHER PUBLICATIONS

International Search Report dated Apr. 28, 2020 for International Application No. PCT/KR2019/012935 and Its English translation.

*Primary Examiner* — Jayne L Mershon
(74) *Attorney, Agent, or Firm* — Insight Law Group, PLLC; Seung Lee

(57) ABSTRACT

Disclosed are a floating photovoltaic panel installation structure and a buoyancy body for the installation of the floating photovoltaic panel, which may have excellent strength and buoyancy performance even while having light-weight characteristics, and stably support a photovoltaic panel on the water even during the flowing of a water surface due to waves. In the floating photovoltaic panel installation structure according to an embodiment of the present disclosure, as the floating photovoltaic panel installation structure including at least one unit floating type structure for supporting a photovoltaic panel on the water, the unit floating type structure includes a plurality of buoyancy bodies arranged to be spaced apart from each other, a photovoltaic panel support structure supported on the plurality of buoyancy bodies, a triangular bracket coupled with a plurality of photovoltaic panel support structures, and a ball joint hinge apparatus for connecting the plurality of photovoltaic panel support structures. At least one buoyancy body among the plurality of buoyancy bodies is made of a material in which Polyethylene and Waste Carbon Fiber Reinforced Plastics (Continued)

have been blended. For maintaining stable position and posture, the buoyancy body may include a cylindrical body having both side surfaces protruded convexly, and both side surfaces of the cylindrical body may be designed to have a shape in which a curvature radius of an upper area is smaller than a curvature radius of a lower area including a portion positioned below the water surface. In order to stably support the photovoltaic panel against the movement of waves, adjacent unit floating type structures may be connected in a joint structure by the ball joint hinge apparatus of a plastic material connected to the end portion of square tubes of the photovoltaic panel support structure.

12 Claims, 22 Drawing Sheets

(56) References Cited

U.S. PATENT DOCUMENTS

| | | | | |
|---|---|---|---|---|
| 2019/0185126 | A1* | 6/2019 | Cromie | B64B 1/40 |
| 2020/0343850 | A1* | 10/2020 | Yang | B63B 35/44 |

FOREIGN PATENT DOCUMENTS

| | | | |
|---|---|---|---|
| KR | 10-2011-0078800 A | | 7/2011 |
| KR | 101171683 | * | 8/2012 |
| KR | 20160033446 | * | 3/2016 |
| KR | 10-1687590 B1 | | 12/2016 |
| KR | 10-2017-0030984 A | | 3/2017 |
| KR | 10-1929428 B1 | | 12/2018 |
| KR | 20190042135 | * | 4/2019 |

\* cited by examiner

FLOATING PHOTOVOLTAIC PANEL INSTALLATION STRUCTURE AND BUOYANCY BODY FOR INSTALLATION OF FLOATING PHOTOVOLTAIC PANEL

CROSS-REFERENCE TO RELATED APPLICATION

This application claims priority to Korean Patent Application No. 10-2019-0094437, filed on Aug. 2, 2018, which is incorporated herein by reference in their entirety.

BACKGROUND OF THE DISCLOSURE

Field of the Disclosure

The present disclosure relates to a floating photovoltaic panel installation structure and a buoyancy body for the installation of the floating photovoltaic panel, and more particularly, to a floating photovoltaic panel installation structure and a buoyancy body for the installation of the floating photovoltaic panel, which may have excellent strength and buoyancy performance even while having light-weight characteristics, and stably support a photovoltaic panel on the water even during the flowing of a water surface due to waves.

Description of Related Art

Recently, as the regulations on environmental pollution and greenhouse gases are strengthened globally, studies on a renewable energy system such as a photovoltaic system capable of replacing the use of a fossil fuel such as coal are being actively conducted. The photovoltaic system is a power generation system for generating electricity by using solar heat, and may be classified into a ground photovoltaic system and a floating photovoltaic system according to the installation environment. The floating photovoltaic system floatingly installs a photovoltaic panel on the water such as a seawall, an ocean, a stream, a river, a dam, a reservoir, or a freshwater lake, and is in the spotlight because it may overcome the space restraints on the ground and install a photovoltaic facility in a large space without damaging a farmland or a forest. Further, the floating photovoltaic system also has the advantages that may enhance the power generation efficiency by the cooling effect on the water surface, prevent the green algae and the red algae by reducing the direct sunlight falling on the water surface, increase the population of fish that live under the floating photovoltaic system, and the like.

Although the floating photovoltaic system requires the strength performance and the buoyancy performance of the degree that may stably support the photovoltaic panel on the water surface, there is a problem in that the weight and cost of the buoyancy body that provides buoyancy to the photovoltaic panel and the support structure increase, and it is difficult to maximize the photovoltaic efficiency in order to enhance the strength/the buoyancy performance. Further, since the floating photovoltaic system is floatingly installed on the water, the flowing of the floating photovoltaic system may occur vertically and horizontally due to the fluctuation of the water surface due to waves, or the like, and the collision between the adjacent photovoltaic panels or the collision between adjacent support structures for supporting the photovoltaic panel may occur due to the flowing, thereby increasing the maintenance cost.

SUMMARY OF THE DISCLOSURE

An object of the present disclosure is to provide a floating photovoltaic panel installation structure and a buoyancy body for the installation of the floating photovoltaic panel, which may have excellent strength and buoyancy performance even while having light-weight characteristics, and stably support a photovoltaic panel on the water even during the flowing of a water surface due to waves.

In a floating photovoltaic panel installation structure according to one aspect of the present disclosure, as the floating photovoltaic panel installation structure including at least one unit floating type structure for supporting a photovoltaic panel on the water, the unit floating type structure includes a plurality of buoyancy bodies arranged to be spaced apart from each other, a photovoltaic panel support structure supported on the plurality of buoyancy bodies, and at least one photovoltaic panel supported by the photovoltaic panel support structure, and at least one buoyancy body among the plurality of buoyancy bodies is made of a material in which Polyethylene and Waste Carbon Fiber Reinforced Plastics have been blended.

Further, the Waste Carbon Fiber Reinforced Plastics may include a waste generated in a process of manufacturing Carbon Fiber Reinforced Plastics.

Further, the at least one buoyancy body may contain 20 to 80 wt % of the Polyethylene, 20 to 80 wt % of the Waste Carbon Fiber Reinforced Plastics, and 3 wt % or more of an ultraviolet shielding agent.

Further, the at least one buoyancy body may contain a High Density Polyethylene having the density of 930 to 970 kg/m$^3$, a Low Density Polyethylene having the density of 915 to 925 kg/m$^3$, a Linear Low Density Polyethylene, and the Waste Carbon Fiber Reinforced Plastics, and provide buoyancy of 10 times or more relative to the weight of the buoyancy body.

Further, the at least one buoyancy body may include a cylindrical body having an upper structure and a lower structure fused and coupled to each other thereon and extending along a first direction, the upper structure may include an upper body having a semi-cylindrical shape with the upper portion cut, and having the internal space partitioned into upper compartments having a lattice structure by upper lattices, and a coupling plate formed integrally above the upper body, and for coupling with the photovoltaic panel support structure, the lower structure may include a lower body having a semi-cylindrical shape with the lower surface curved and having the internal space partitioned into lower compartments to have the lattice structure by lower lattices, and the cylindrical body may be formed with a plurality of air pockets having the lattice structure in the internal space by the upper compartments and the lower compartments.

Further, the photovoltaic panel support structure may include square tubes made of a corrosion-resistant metal material disposed on the plurality of buoyancy bodies, the coupling plate of the buoyancy body may be extended to be protruded from both side edges of the upper surface of the upper body toward the outside, the upper surface of the coupling plate may be formed to have a flat surface, and coupling holes for coupling at least one square tube among the square tubes may be penetrated and formed on the edge portion of the coupling plate expanding from the upper body to the outside.

Further, the photovoltaic panel support structure may include a triangular bracket for having a spacing distance (d) in order to prevent the photovoltaic panel from being flooded due to waves or roller of the water surface, and the triangular bracket may be made of a material in which the Polyethylene and the Waste Carbon Fiber Reinforced Plastics have been blended.

Further, the at least one square tube among the square tubes may be made of a material in which the Polyethylene and the Waste Carbon Fiber Reinforced Plastics have been blended.

Further, the floating photovoltaic panel installation structure may include the unit floating type structure in plural, and in order to stably support the photovoltaic panel against the movement of waves, adjacent unit floating type structures include a hinge apparatus of a joint structure by the ball joint hinge apparatus of a plastic material connected to the end portions of the square tubes.

Further, both side surfaces of the cylindrical body with respect to the first direction may have a convex shape protruded from the cylindrical body to the outside, the both side surfaces of the cylindrical body may have a curvature radius changed with the height, a lower area including a portion positioned below the water surface of the both side surfaces of the cylindrical body may have a first arc shape having a first curvature radius, and an upper area higher than the lower area of the both side surfaces may have a second arc shape having a second curvature radius smaller than the first curvature radius.

Further, both side surfaces of the cylindrical body with respect to the first direction may have a convex shape protruded from the cylindrical body to the outside, the both side surfaces of the cylindrical body may have a curvature radius changed with the height, the both side surfaces of the cylindrical body may have a first lower area, a second lower area, a first upper area, and a second upper area in order disposed thereon from the lowermost end of the cylindrical body to the uppermost end thereof, the curvature radiuses of the first lower area and the second upper area may be formed to be smaller than the curvature radiuses of the second lower area and the first upper area, the curvature radius of the first lower area and the curvature radius of the second upper area may be the same as each other, and the curvature radius of the second lower area and the curvature radius of the first upper area may be the same as each other.

Further, the air pocket of the cylindrical body may include a first air pocket, a second air pocket, and a third air pocket formed to have different volumes from each other, an air pocket having the largest volume and air pockets having the next largest volume among the first air pocket, the second air pocket, and the third air pocket may be disposed on both side surfaces of the cylindrical body with respect to the first direction, and air pockets having the smallest volume are disposed at the middle side of the cylindrical body.

A buoyancy body for the installation of a floating photovoltaic panel according to another aspect of the present disclosure, as the buoyancy body for the installation of the floating photovoltaic panel for supporting a photovoltaic panel on the water, may include a cylindrical body having the cross section perpendicular to a first direction having a circular shape with the upper portion cut, extending along the first direction, and providing buoyancy for supporting the photovoltaic panel, and the cylindrical body may be made of a material in which Polyethylene and Waste Carbon Fiber Reinforced Plastics have been blended.

Further, the cylindrical body may include a High Density Polyethylene having the density of 930 to 970 kg/m$^3$, a Low Density Polyethylene having the density of 915 to 925 kg/m$^3$, a Linear Low Density Polyethylene, and the Waste Carbon Fiber Reinforced Plastics, the Waste Carbon Fiber Reinforced Plastics may include a waste generated in a process of manufacturing Carbon Fiber Reinforced Plastics, and the cylindrical body may be configured to contain 20 to 80 wt % of the Polyethylene, to 80 wt % of the Waste Carbon Fiber Reinforced Plastics, and 3 wt % or more of an ultraviolet shielding agent, and to provide buoyancy of 10 times or more relative to the weight of the cylindrical body.

Further, the cylindrical body may have a structure having an upper structure and a lower structure fused and coupled to each other thereon, the upper structure may include an upper body having a semi-cylindrical shape with the upper portion cut, and having the internal space partitioned into upper compartments having a lattice structure by upper lattices, and a coupling plate formed integrally above the upper body, and for coupling with the photovoltaic panel support structure for supporting the photovoltaic panel, and the lower structure may include a lower body having a semi-cylindrical shape with the lower surface curved and having the internal space partitioned into lower compartments to have the lattice structure by lower lattices, and the cylindrical body may be formed with a plurality of air pockets having the lattice structure in the internal space by the upper compartments and the lower compartments.

Further, both side surfaces of the cylindrical body with respect to the first direction may have a convex shape protruded from the cylindrical body to the outside, the both side surfaces of the cylindrical body may have a curvature radius changed with the height, a lower area including a portion positioned below the water surface of the both side surfaces of the cylindrical body has a first arc shape having a first curvature radius, and an upper area higher than the lower area of the both side surfaces may have a second arc shape having a second curvature radius smaller than the first curvature radius.

Further, both side surfaces of the cylindrical body with respect to the first direction may have a convex shape protruded from the cylindrical body to the outside, the both side surfaces of the cylindrical body may have a curvature radius changed with the height, the both side surfaces of the cylindrical body may have a first lower area, a second lower area, a first upper area, and a second upper area in order disposed thereon from the lowermost end of the cylindrical body to the uppermost end thereof, the curvature radiuses of the first lower area and the second upper area may be formed to be smaller than the curvature radiuses of the second lower area and the first upper area, the curvature radius of the first lower area and the curvature radius of the second upper area may be the same as each other, and the curvature radius of the second lower area and the curvature radius of the first upper area may be the same as each other.

Further, the air pocket of the cylindrical body may include a first air pocket, a second air pocket, and a third air pocket formed to have different volumes from each other, an air pocket having the largest volume and air pockets having the next largest volume among the first air pocket, the second air pocket, and the third air pocket may be disposed on both side surfaces of the cylindrical body with respect to the first direction, and air pockets having the smallest volume may be disposed at the middle side of the cylindrical body.

According to an embodiment of the present disclosure, it is possible to provide the floating photovoltaic panel installation structure and the buoyancy body for the installation of the floating photovoltaic panel, which may have excellent strength and buoyancy performance even while having light-weight characteristics, and stably support the photovoltaic panel on the water even during the flowing of the water surface due to waves.

DESCRIPTION OF SPECIFIC EMBODIMENTS

Figure 1:
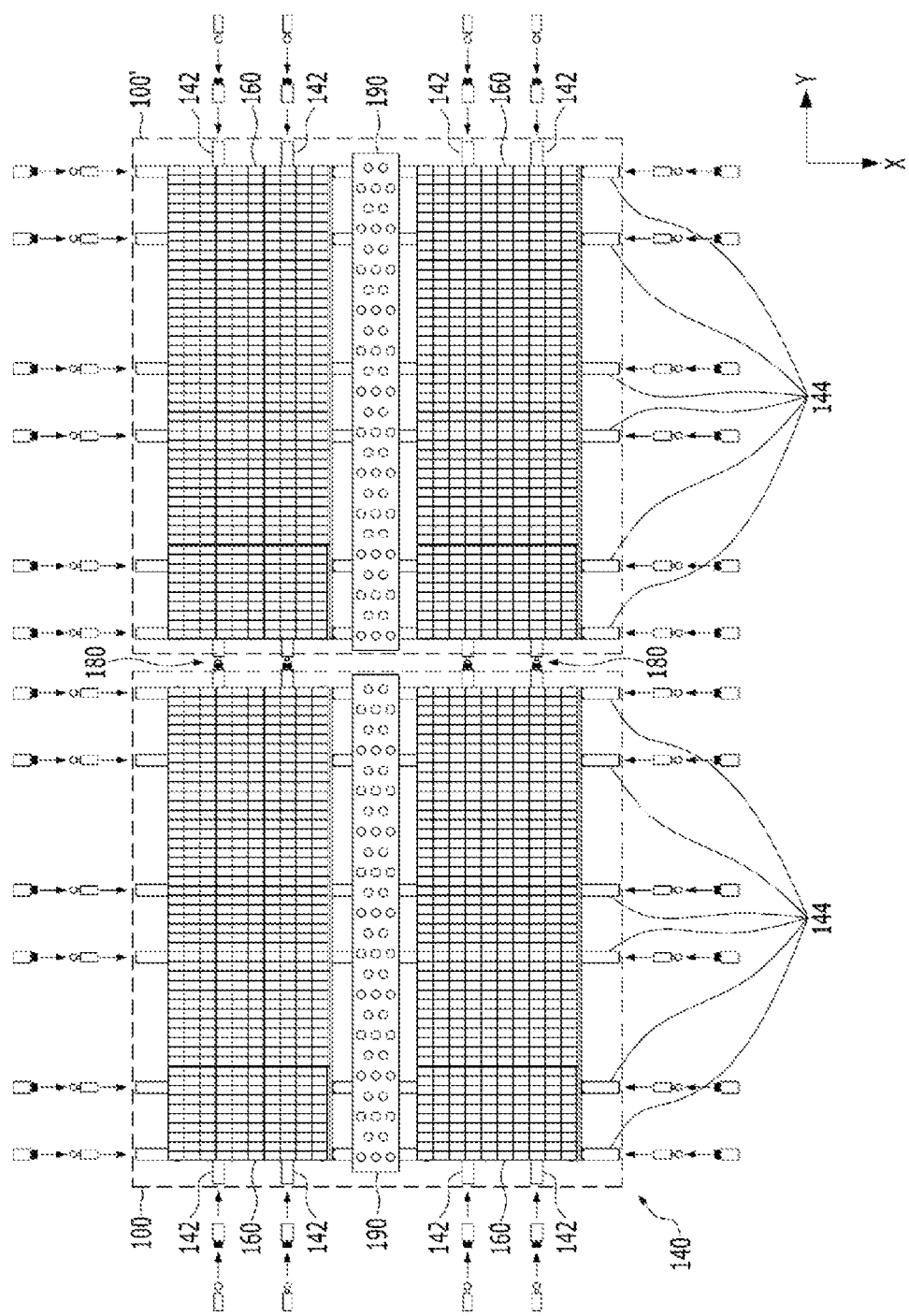
FIG. 1 is a plane diagram of a floating photovoltaic panel installation structure according to an embodiment of the present disclosure.

Hereinafter, embodiments of the present disclosure will be described in detail with reference to the accompanying drawings so that those skilled in the art to which the present disclosure pertains may easily practice it. The present disclosure may be implemented in various different forms and is not limited to the embodiments described herein. Further, since the size and thickness of each component illustrated in the drawing are arbitrarily illustrated for convenience of description, the present disclosure is not necessarily limited to the illustrated one.

In the present specification, when a part is said to "include" a component, it means that it may further include other components, without excluding the other components unless otherwise stated. In the drawings, parts irrelevant to the description have been omitted in order to clearly describe the present disclosure and the same or like components have been denoted by the same reference numerals throughout the specification.

FIG. 1 is a plane diagram of a floating photovoltaic panel installation structure according to an embodiment of the present disclosure. Referring to FIG. 1, a floating photovoltaic panel installation structure 10 according to an embodiment of the present disclosure may be provided to floatingly install a plurality of photovoltaic panels 160 on the water such as the water surface of Saemangeum, or the like, an ocean, a stream, a river, a dam, a reservoir, or a freshwater lake. The floating photovoltaic panel installation structure 10 may include a plurality of unit floating type structures 100, 100' floatingly installed on the water. Each of the unit floating type structures 100, 100' is provided to support at least one photovoltaic panel 160 on the water.

Although each of the unit floating type structures 100, 100' is configured to support two photovoltaic panels 160 in an embodiment of FIG. 1, each of the unit floating type structures 100, 100' may also be configured to support one photovoltaic panel 160 or three or more photovoltaic panels 160. The plurality of unit floating type structures 100, 100' may be arranged in a plurality of rows and columns. Although it has been illustrated in FIG. 1 that two unit floating type structures 100, 100' have been connected to each other, it is natural that the floating photovoltaic panel installation structure 10 may be configured so that three or more unit floating type structures 100, 100' are connected to each other.

The plurality of unit floating type structures 100, 100' may be connected to each other by a plurality of ball joint hinge apparatuses 180. An angle between the unit floating type structures 100, 100' may be smoothly adjusted therebetween through the ball joint hinge apparatus 180 when a flow occurs on the water surface due to waves or the like, and accordingly, it is possible to maintain a stable support state of the photovoltaic panel 160. The ball joint hinge apparatus 180 will be described in more detail later with reference to FIGS. 10 to 15. At this time, the ball joint hinge apparatus 180 may be referred to as a ball joint link.

Figure 2:
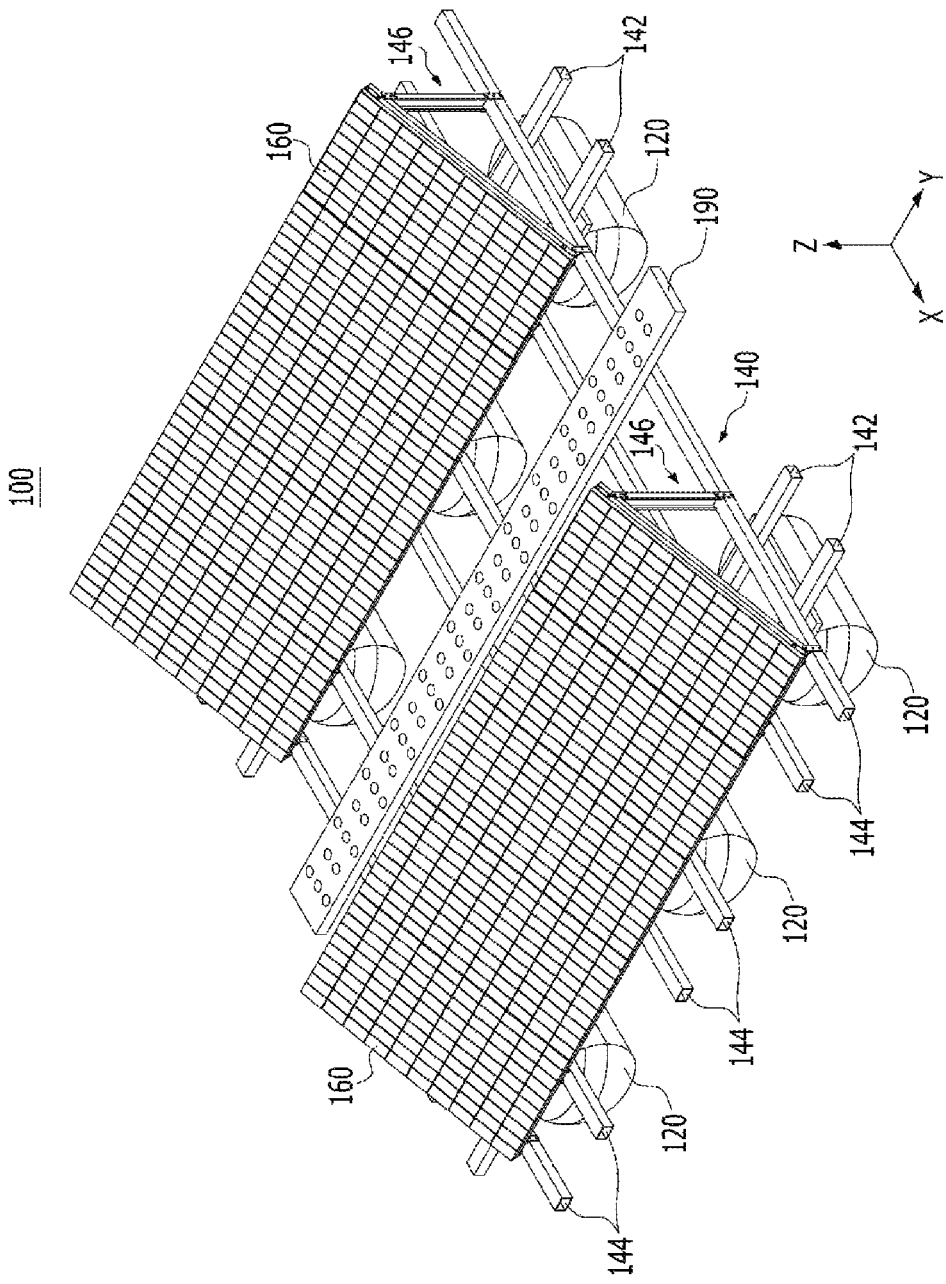
FIG. 2 is a perspective diagram of a unit floating type structure constituting the floating photovoltaic panel installation structure according to an embodiment of the present disclosure.

FIG. 2 is a perspective diagram of a unit floating type structure constituting the floating photovoltaic panel installation structure according to an embodiment of the present disclosure. Referring to FIGS. 1 and 2, the unit floating type structure 100 may include a plurality of buoyancy bodies 120 for providing buoyancy, a triangular bracket 170 for spacing the photovoltaic panel support structure 140 supported on the plurality of buoyancy bodies 120 and floating on the water surface apart from and the photovoltaic panel by a distance (d) on the water surface, the ball joint hinge apparatus 180 for connecting the photovoltaic panel support structure, and at least one photovoltaic panel 160 supported by the photovoltaic panel support structure 140.

Figure 3:
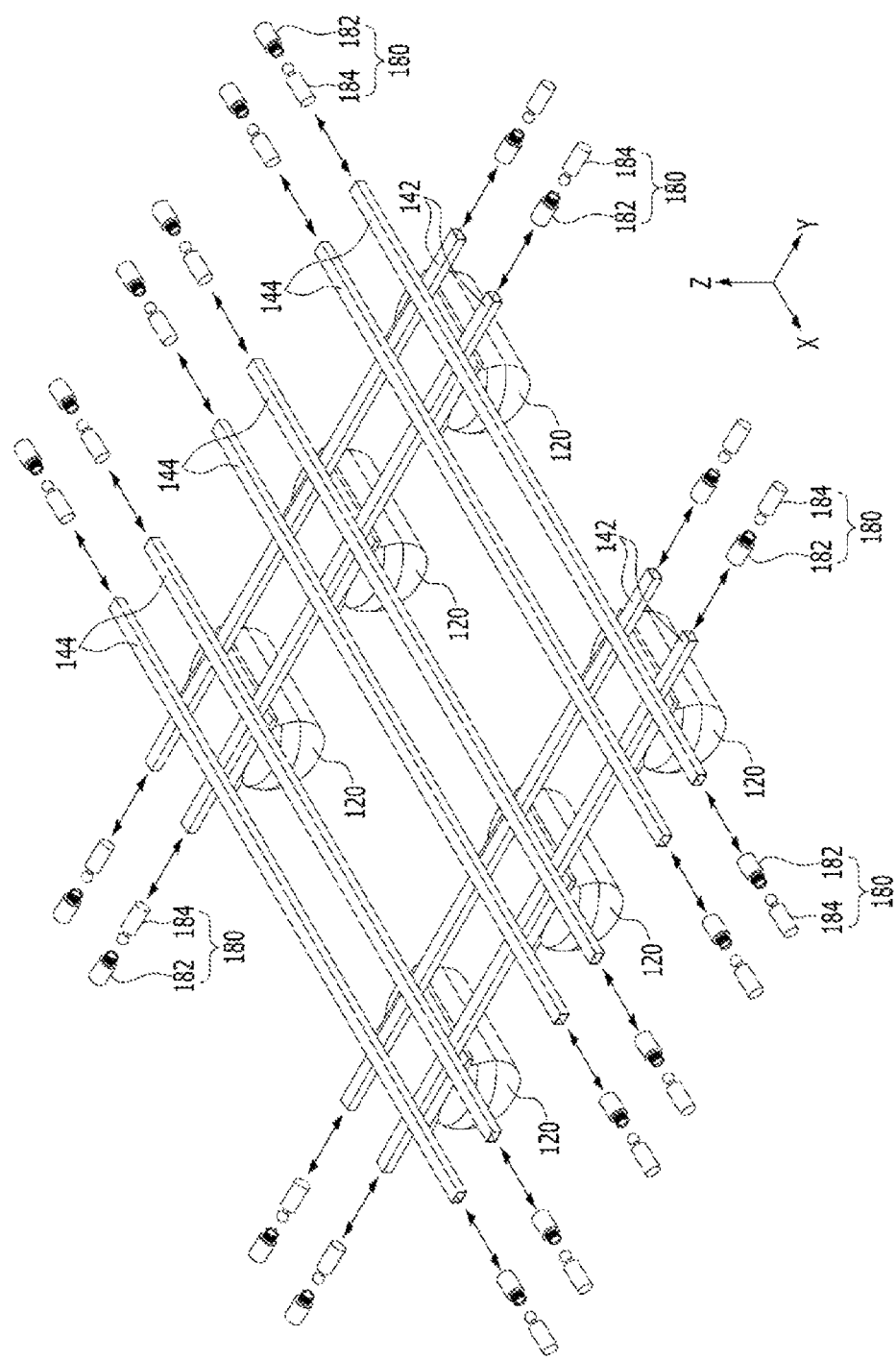
FIG. 3 is a perspective diagram illustrating a plurality of buoyancy bodies and photovoltaic panel support structure constituting the floating photovoltaic panel installation structure according to an embodiment of the present disclosure.

FIG. 3 is a perspective diagram illustrating a plurality of buoyancy bodies and photovoltaic panel support structure constituting the floating photovoltaic panel installation structure according to an embodiment of the present disclosure. Referring to FIGS. 1 to 3, the plurality of buoyancy bodies 120 may be arranged to be spaced apart from each other below the photovoltaic panel support structure 140. The plurality of buoyancy bodies 120 may be arranged in the appropriate number and interval to provide the buoyancy sufficient for floating the photovoltaic panel support structure 140 and the photovoltaic panel 160, and is preferably prepared in four or more every unit floating type structure 100. Although each unit floating type structure 100 includes six buoyancy bodies 120 in a 3×2 arrangement structure in the illustrated embodiment, the number of buoyancy bodies 120 of the unit floating type structure 100 may be changed variously.

At least one buoyancy body 120 of the plurality of buoyancy bodies 120 may be made of a material in which Polyethylene and Waste Carbon Fiber Reinforced Plastics (WCFRP) of high-tech composites are blended. The Waste Carbon Fiber Reinforced Plastics may include a waste (for example, low-grade Carbon Fiber Reinforced Plastics that do not meet a predetermined reference) generated in a process of manufacturing the Carbon Fiber Reinforced Plastics, which is a composite polymer material of carbon fiber and plastic or the Carbon Fiber Reinforced Plastics wasted by the reason such as the shortened length of the carbon fiber. The buoyancy body 120 in which the Polyethylene and the Waste Carbon Fiber Reinforced Plastics have been blended may be inexpensive, may have sufficient strength and rigidity capable of supporting the photovoltaic panel support structure 140 and the photovoltaic panel 160 even while light-weighting the buoyancy body 120, and at the same time, provide buoyancy sufficient for floating the photovoltaic panel support structure 140 and the photovoltaic panel 160 on the water.

In an embodiment, the buoyancy body 120 may contain 3 wt % or more of an ultraviolet shielding agent, and contain more than 0 and 97 wt % or less of the Polyethylene and the Waste Carbon Fiber Reinforced Plastics. In order to secure the light-weight, the strength/rigidity, and the buoyancy performance, the buoyancy body 120 may be made of a material containing a High Density Polyethylene having the density of 930 to 970 kg/m$^3$, a Low Density Polyethylene having the density of 915 to 925 kg/m$^3$, a Linear Low Density Polyethylene, and the Waste Carbon Fiber Reinforced Plastics.

According to an embodiment of the present disclosure, it is possible to secure the rigidity for supporting the photovoltaic panel support structure 140 and the photovoltaic panel 160 while minimizing the weight of the buoyancy body 120. Further, it is possible to provide the buoyancy of about 10 times or more relative to the weight of the buoyancy body 120 by the buoyancy body 120. In an embodiment, the buoyancy body 120 may be designed to have the weight of about 10 to 30 kg (for example, about 20 kg), and to provide the buoyancy of about 200 to 300 kg (for example, about 260 kg) or more.

The photovoltaic panel support structure 140 may be disposed above the plurality of buoyancy bodies 120. The photovoltaic panel support structure 140 may include square tubes 142, 144 made of a corrosion-resistant metal material disposed on the plurality of buoyancy bodies 120, a photovoltaic panel supporter 146 and a triangular bracket 170 supported on the square tubes 142, 144 to support the photovoltaic panel 160, and the ball joint hinge apparatus 180. The square tubes 142, 144 may include the first square tubes 142 coupled on the plurality of buoyancy bodies 120 in a second direction (Y) perpendicular to a first direction (X), and the second square tubes 144 coupled on the first square tubes 142 in the first direction (X). Bolting fastening, welding fastening, or the like may be used as a fixing method of the first square tubes 142 and the second square tubes 144, but the present disclosure is not limited to this fastening method.

In an embodiment, the first square tubes 142 may be arranged in the second direction (Y) on the buoyancy bodies 120 arranged along the second direction (Y) to be coupled on the buoyancy bodies 120. The second square tubes 144 may be arranged in the first direction (X) on the buoyancy bodies 120 arranged along the first direction (X) to be coupled on the first square tubes 142. Although two first square tubes 142 and two second square tubes 144 are coupled to each of the buoyancy bodies 120 in the illustrated embodiment, the number of the square tubes 142, 144 coupled on the buoyancy body 120 is not limited thereto.

In an embodiment, some of the square tubes 142, 144 may be provided as a square tube formed of a high corrosion-resistant plating steel plate (for example, PosMAC), and others of the square tubes 142, 144 may be made of a material in which the Polyethylene and the Waste Carbon Fiber Reinforced Plastics have been blended. In order to secure the strength/rigidity for supporting the photovoltaic panel and the light-weight, a ratio of blending the Polyethylene and the Waste Carbon Fiber Reinforced Plastics may be designed in the range of 20:80 to 80:20. It is possible to use heterogeneous square tubes 142, 144 in combination, thereby light-weighting the photovoltaic panel support structure 140 while supporting the photovoltaic panel 160 with sufficient strength and rigidity, and saving the manufacturing cost.

In an embodiment, some of the two or more first square tubes 142 coupled on one buoyancy body 120 may be provided as PosMAC square tubes, and others of the first square tubes 142 may be made of a material in which the Polyethylene and the Waste Carbon Fiber Reinforced Plastics have been blended. Further, some of the two or more second square tubes 144 coupled on one buoyancy body 120 may be provided as PosMAC square tubes, and others of the second square tubes 144 may be made of a material in which the Polyethylene and the Waste Carbon Fiber Reinforced Plastics have been blended.

In an embodiment, a maintenance scaffold 190 may be fixed between the photovoltaic panels 160 on the second square tubes 144. The maintenance scaffold 190 may provide the moving route for an operator to perform the maintenance work of the floating photovoltaic panel installation structure. The maintenance scaffold 190 may be installed in parallel with the photovoltaic panel 160, and arranged in the first direction (X) or the second direction (Y). The maintenance scaffold 190 may be made of a material in which the Polyethylene and the Waste Carbon Fiber Reinforced Plastics have been blended. In an embodiment, in order to secure the strength/rigidity performance and the light-weight, a ratio of blending the Polyethylene and the Waste Carbon Fiber Reinforced Plastics constituting the maintenance scaffold 190 may be designed in the range of 20:80 to 80:20. The maintenance scaffold 190 may be provided as a perforated plate having a plurality of holes perforated for the light-weight. Although the maintenance scaffold 190 is installed on the second square tubes 144 in the illustrated embodiment, the maintenance scaffold 190 may also be installed on the first square tubes 142.

Figure 4:
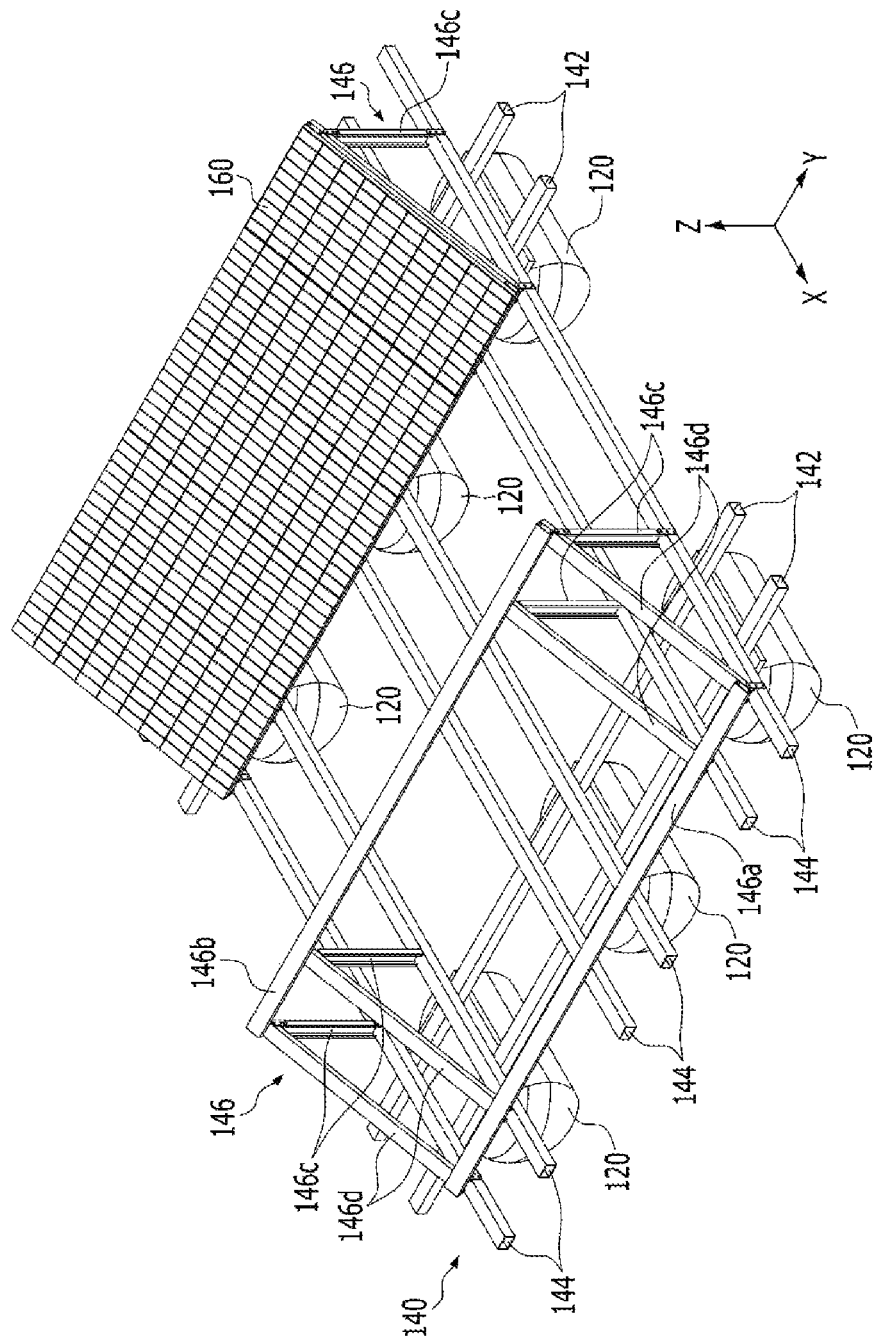
FIG. 4 is a perspective diagram illustrating a portion of the floating photovoltaic panel installation structure according to an embodiment of the present disclosure.

FIG. 4 is a perspective diagram illustrating a portion of the floating photovoltaic panel installation structure according to an embodiment of the present disclosure. Referring to FIG. 4, the photovoltaic panel supporter 146 may be provided to have sufficient strength and rigidity to support the weight of the photovoltaic panel 160. The photovoltaic panel supporter 146 may be designed in a C-shaped steel, an H-shaped steel, a square tube, or the like. The photovoltaic panel supporter 146 may be made of a material in which the Polyethylene and the Waste Carbon Fiber Reinforced Plastics have been blended at a ratio of 20:80 to 80:20. In an embodiment, the photovoltaic panel supporter 146 may include a lower supporter 146a, an upper supporter 146b, vertical supporters 146c, inclined supporters 146d, and the triangular bracket 170.

The lower supporter 146a may be coupled on the second square tubes 144 in the second direction (Y). The vertical supporters 146c may be vertically coupled on the second square tubes 144 at a position spaced apart from the lower supporter 146a in the first direction (X). The upper supporter 146b may be coupled on the upper ends of the vertical supporters 146c in the second direction (Y). The inclined supporters 146d may have one end coupled to the lower supporter 146a and have the other end coupled to the upper supporter 146b.

The photovoltaic panel 160 is coupled on the triangular bracket 170, the lower supporter 146a, the upper supporter 146b, and the inclined supporters 146d to be supported in the inclined direction mainly facing the sun by the photovoltaic panel supporter 146. The photovoltaic panel 160 may be installed in a structure in which a plurality of photovoltaic cells have been arranged in the first direction (X) and the second direction (Y). Although two photovoltaic panel supporters 146 are installed on the unit floating type structure 100 along the first direction (X) in the illustrated embodiment, the number and arrangement structure of the photovoltaic panel supporters 146 may be changed variously according to the number of installation, size, and the like of the photovoltaic panel 160.

Figure 5:
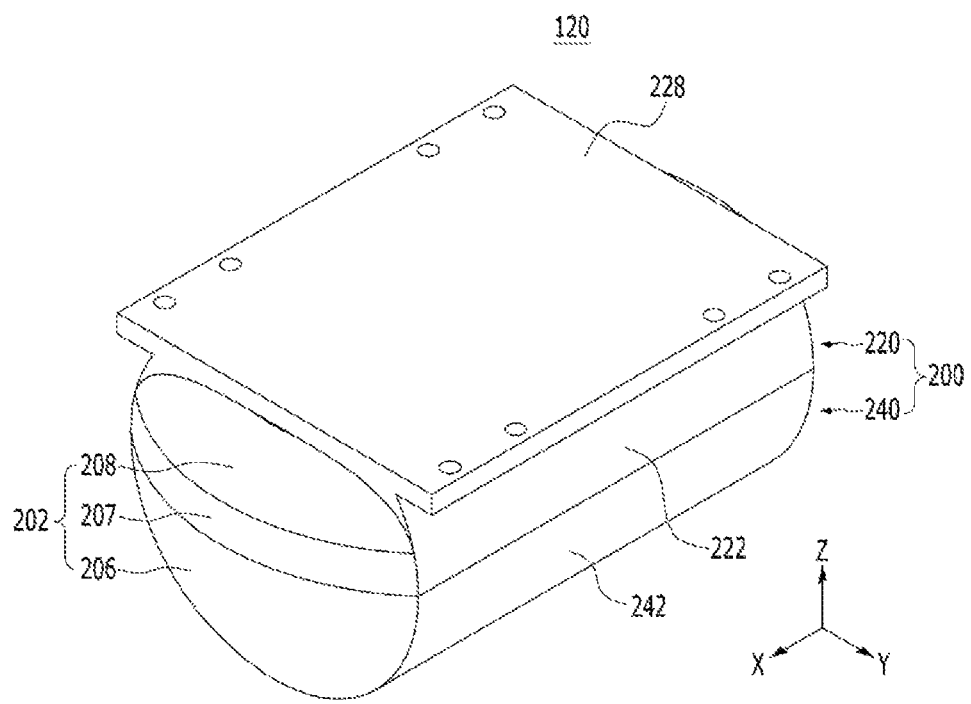
FIG. 5 is a perspective diagram of a buoyancy body constituting the floating photovoltaic panel installation structure according to an embodiment of the present disclosure.
Figure 6:
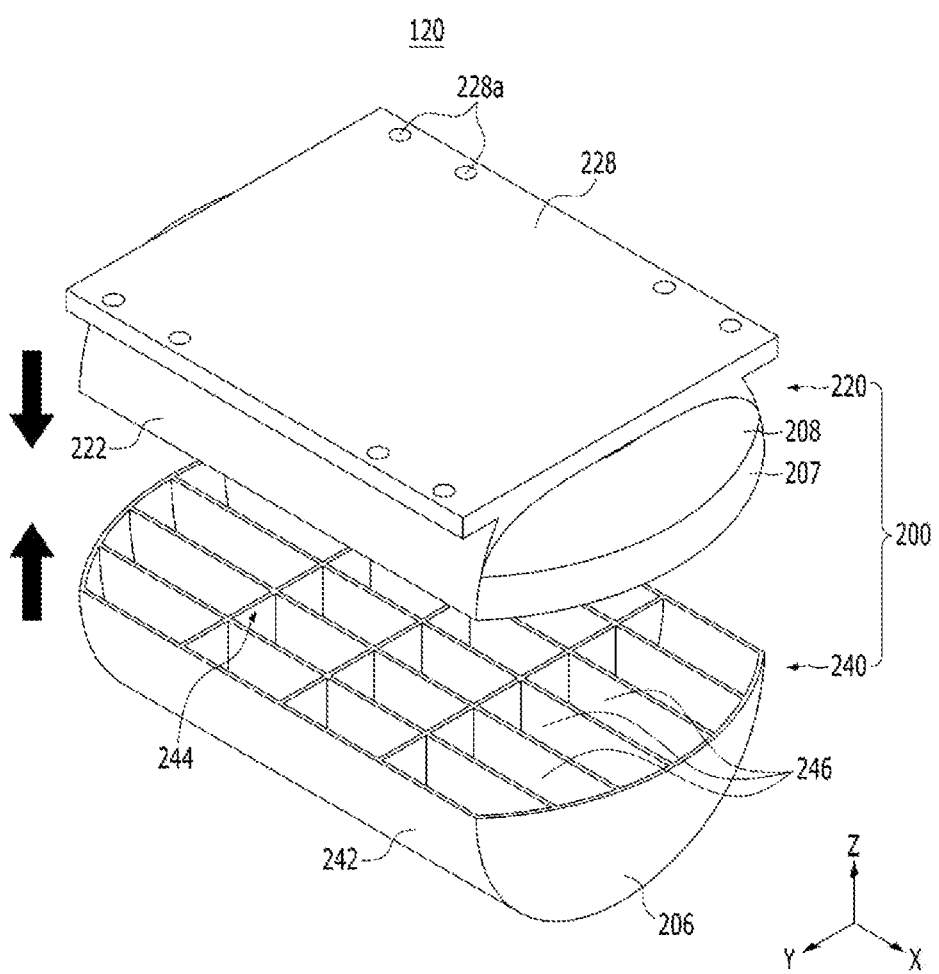
FIG. 6 is an exploded perspective diagram of a buoyancy body constituting the floating photovoltaic panel installation structure according to an embodiment of the present disclosure.
Figure 7:
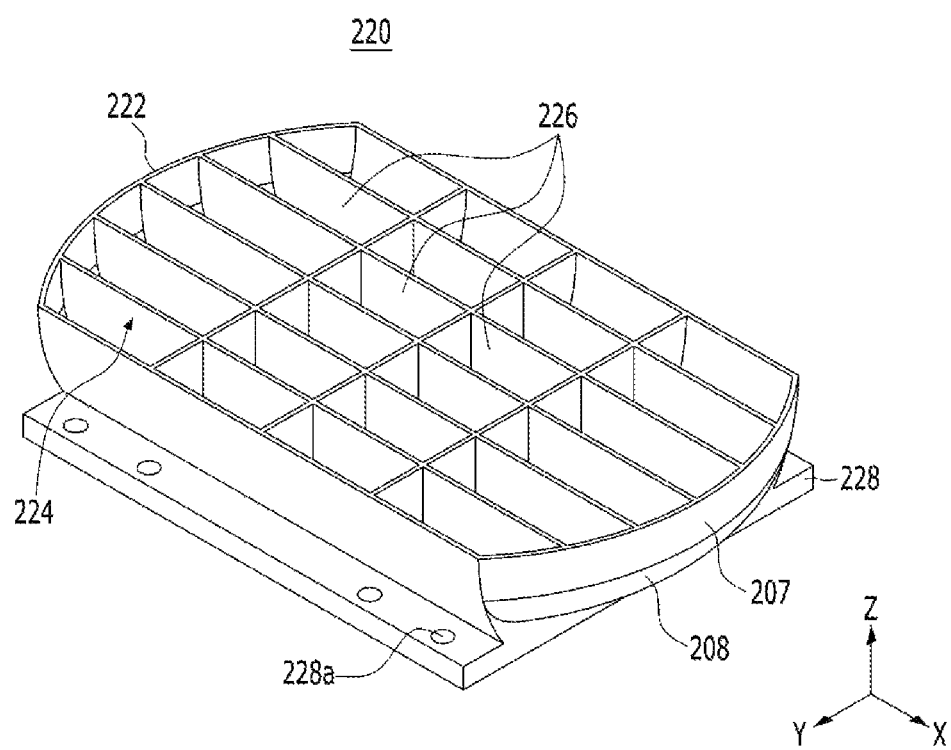
FIG. 7 is a perspective diagram of an upper structure constituting a buoyancy body for the installation of the floating photovoltaic panel according to an embodiment of the present disclosure.
Figure 8:
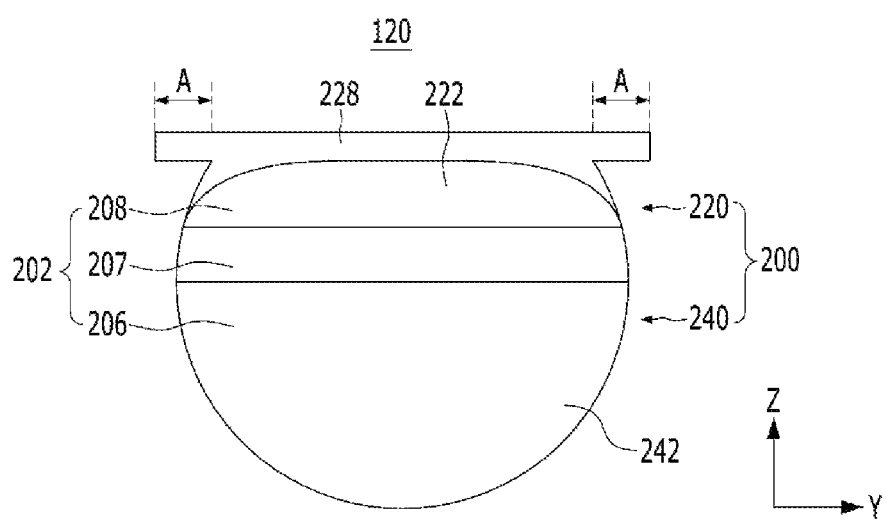
FIG. 8 is a side diagram of the buoyancy body for the installation of the floating photovoltaic panel according to an embodiment of the present disclosure.
Figure 9:
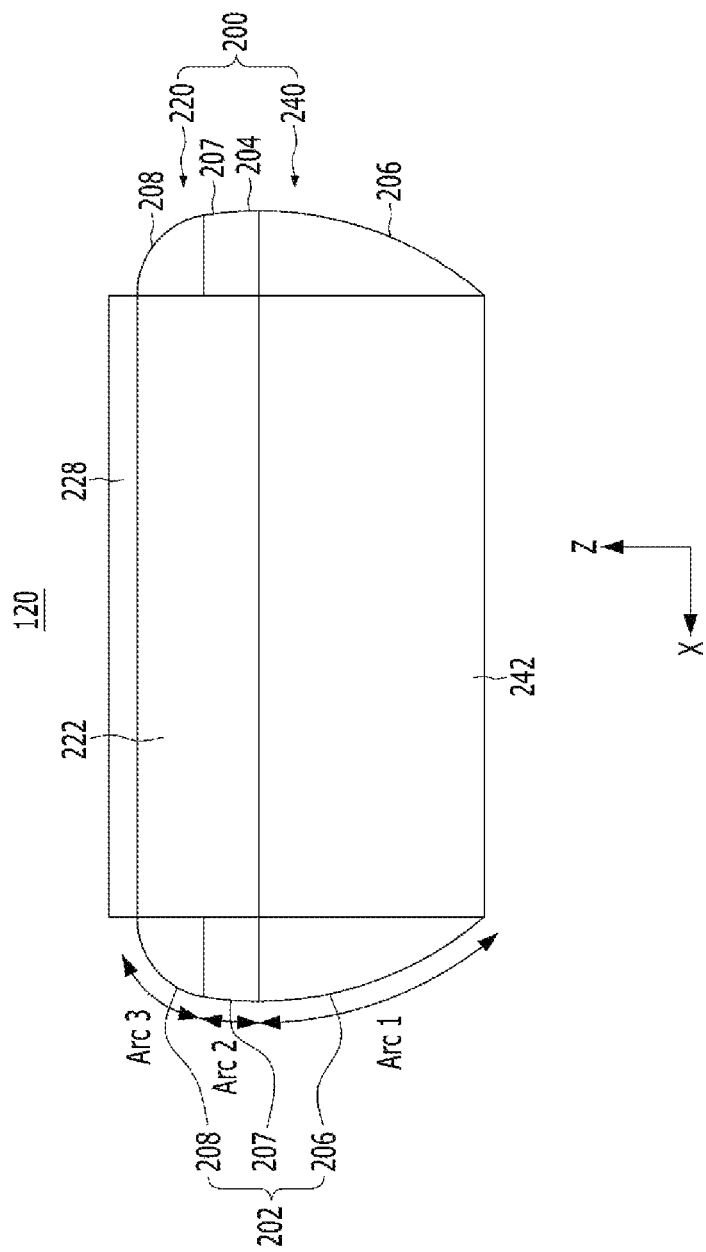
FIG. 9 is a front diagram of the buoyancy body for the installation of the floating photovoltaic panel according to an embodiment of the present disclosure.

FIG. 5 is a perspective diagram of the buoyancy body constituting the floating photovoltaic panel installation structure according to an embodiment of the present disclosure. FIG. 6 is an exploded perspective diagram of the buoyancy body constituting the floating photovoltaic panel installation structure according to an embodiment of the present disclosure. FIG. is a perspective diagram of an upper structure constituting the buoyancy body for the installation of the floating photovoltaic panel according to an embodiment of the present disclosure. FIG. 8 is a side diagram of the buoyancy body for the installation of the floating photovoltaic panel according to an embodiment of the present disclosure. FIG. 9 is a front diagram of the buoyancy body for the installation of the floating photovoltaic panel according to an embodiment of the present disclosure.

Referring to FIGS. 5 to 9, the buoyancy body 120 may include a cylindrical body 200 extending along the first direction (X). The cylindrical body 200 may provide buoyancy for supporting the photovoltaic panel support structure 140 and the photovoltaic panel 160. The cross-sectional shape of the cylindrical body 200 in the direction perpendicular to the first direction (X) may be provided in a circular shape with the upper portion cut. In an embodiment, the cross-sectional shape of the cylindrical body 200 may be provided in a shape with the upper portion cut by about fifth of the diameter of the circular cross section.

In an embodiment, the cylindrical body 200 may be manufactured by fusing and coupling the upper structure 220 and the lower structure 240 to each other. In an embodiment, for the smooth fusion coupling between the upper structure 220 and the lower structure 240, the upper structure 220 and the lower structure 240 may contain about 20 to 80 wt % of the Polyethylene, and contain about 20 to 80 wt % of the Waste Carbon Fiber Reinforced Plastics to secure the light-weight and the strength/rigidity.

The upper structure 220 may include an upper body 222 having a semi-circular cross-sectional shape with the upper portion cut, and a coupling plate 228 of a square plate shape formed integrally above the upper body 222 so that the photovoltaic panel support structure 140 may be stably fixed. The upper body 222 may have the internal space partitioned into upper compartments 226 by upper lattices 224. The upper lattices 224 may be formed in plural in the first direction (X) and the second direction (Y).

In order for the first square tubes 142 to be coupled on the coupling plate 228 firmly and easily, the upper surface of the coupling plate 228 may be provided as a flat surface. In an embodiment, the coupling plate 228 may extend outwards along the second direction (Y) from both side edges of the upper surface of the upper body 222 by a protrusion distance (A), and the coupling holes 228a for coupling with the first square tubes 142 may be penetrated and formed in a third direction (Z), which is a vertical direction thereof, around two edges of the coupling plate 228 extending outwards from the upper body 222. The first square tubes 142 may be coupled to the coupling plate 228 by a fastening means such as a bolt fastened to the coupling holes 228a.

The lower structure 240 may include a lower body 242 having a semi-circular cross-sectional shape. The lower body 242 may be provided as a shape having the lower surface curved in a semi-circular shape, and have the internal space partitioned into lower compartments 246 by lower lattices 244. The lower lattices 244 may be formed in plural in the first direction (X) and the second direction (Y). The cylindrical body 200 may have a plurality of air pockets formed in a lattice structure therein by the upper compartments 226 and the lower compartments 246. Although 24 air pockets are formed inside the cylindrical body 200 in the illustrated embodiment, the number, shape, and the like of the air pocket may be modified variously.

The upper structure 220 and the lower structure 240 may be manufactured by a press injection molding product, respectively, and then fused and coupled to each other. Both side surfaces 202, 204 of the cylindrical body 200 with respect to the first direction (X) may have a convex shape protruded outwards from the cylindrical body 200. Both side surfaces 202, 204 of the cylindrical body 200 may be designed to have the curvature radius changed with the height. Both side surfaces 202, 204 of the cylindrical body 200 may be configured so that a lower area 206 including a portion positioned below the water surface may have a first arc shape having a first curvature radius (Arc1), and an upper area 208 higher than the lower area 206 may have a second arc shape having a second curvature radius (Arc3) smaller than the first curvature radius (Arc1) of the lower area 206.

An intermediate area 207 may be formed between the upper area 208 and the lower area 206 of both side surfaces 202, 204 of the cylindrical body 200. The curvature radius (Arc2) of the intermediate area 207 may be larger than the second curvature radius (Arc3) of the upper area 208. The curvature radius (Arc2) of the intermediate area 207 may also be the same as the first curvature radius (Arc1) of the lower area 206 and may also be larger or smaller than the first curvature radius (Arc1) of the lower area 206. According to an embodiment of the present disclosure, the upper area 208 of the cylindrical body 200 above the water surface may be designed to have a small curvature and the lower area 206 mainly below the water surface may contact the water more smoothly, thereby stably maintaining the position and posture of the buoyancy body 120.

Hereinafter, the buoyancy body 120 optimally designed on the water surface near the Saemangeum seawall will be described. The buoyancy body 120 may have the height of about 600 to 700 mm (for example, about 665 mm), the length of the coupling plate 228 may be designed to have about 1000 to 1200 mm (for example, about 1100 mm) in the first direction (X), the length of the coupling plate 228 may be designed to have about 800 to 1000 mm (for example, about 890 mm) in the second direction (Y), and the thickness of the coupling plate 228 may be designed to have about 50 mm. The width (diameter of the cylindrical body) of the buoyancy body 120 in the second direction (Y) may be designed to have about 700 to 900 mm (for example, 800 mm).

Both side surfaces of the cylindrical body 200 of the buoyancy body 120 may be designed to be protruded about 100 to 200 mm (for example, about 150 mm) with respect to the end portion of the coupling plate 228. The thickness of the lattices inside the cylindrical body 200 may be designed to have about 4 to 5 mm (for example, about 4.5 mm). The height of the lower area 206 having the first curvature radius (Arc1) may be designed to have ½ or more of the height of the buoyancy body 120. The heights of the upper area 208 having the second curvature radius (Arc3) and the intermediate area 207 may be designed to have about ⅓ to ⅙ of the height of the buoyancy body 120, respectively.

Figure 10:
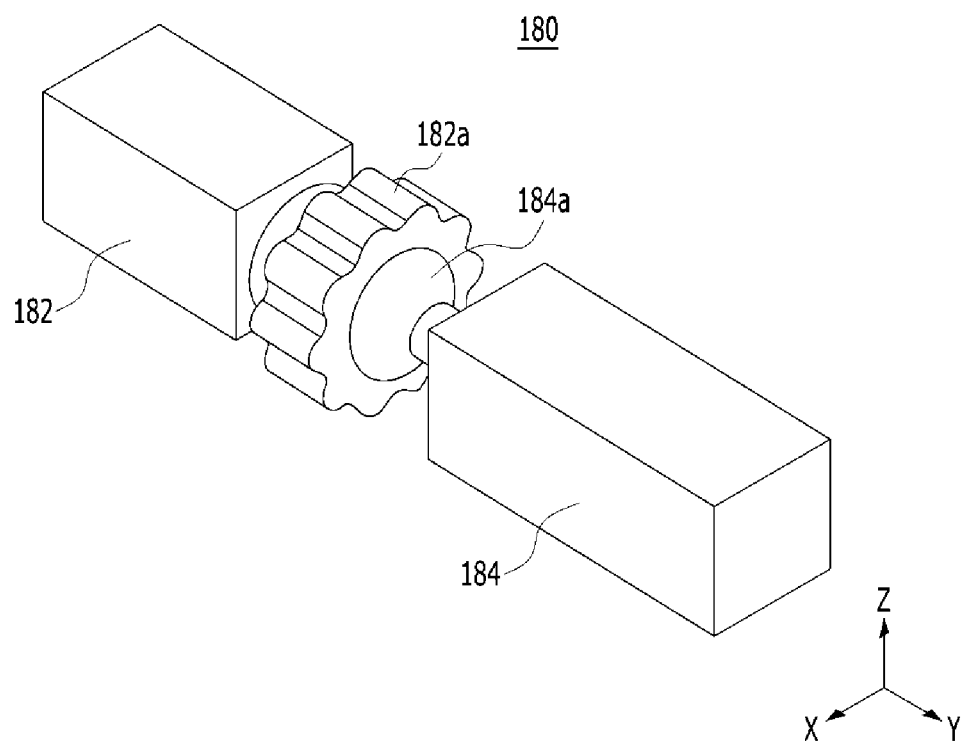
FIG. 10 is a perspective diagram of a ball joint hinge apparatus constituting the floating photovoltaic panel installation structure according to an embodiment of the present disclosure.
Figure 11:
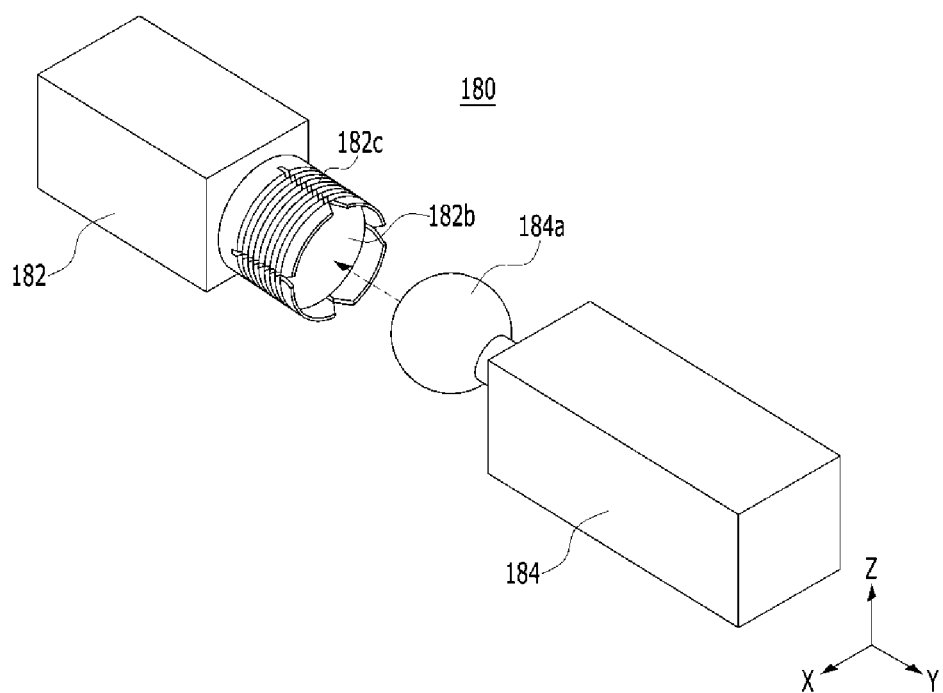
FIG. 11 is a partial perspective diagram of the ball joint hinge apparatus constituting the floating photovoltaic panel installation structure according to an embodiment of the present disclosure.
Figure 12:
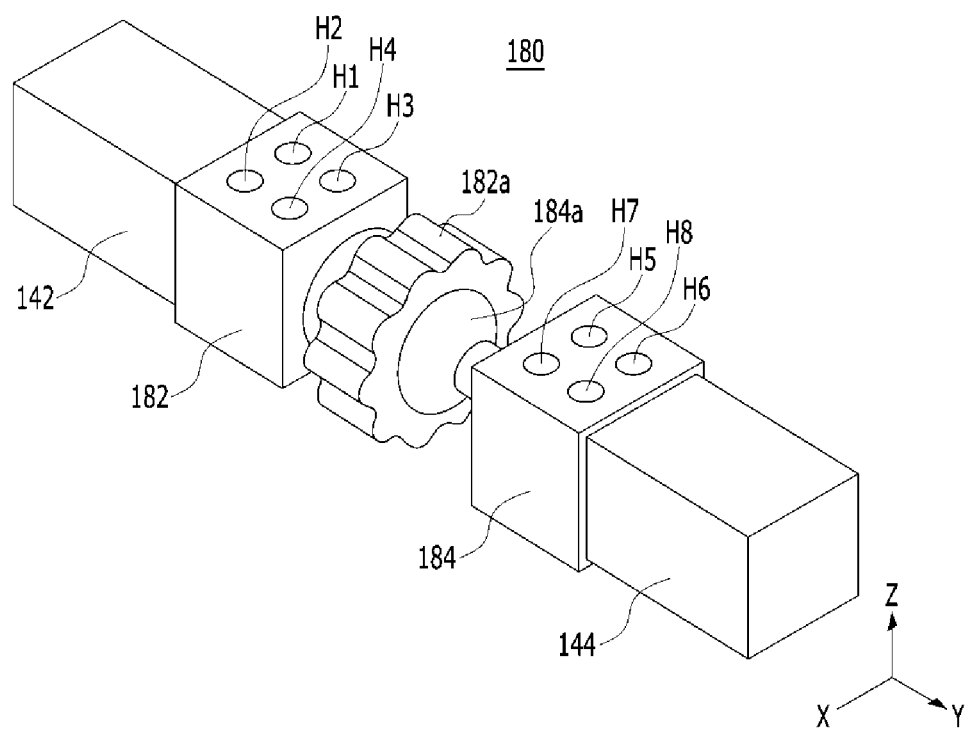
FIG. 12 is a perspective diagram for explaining the connection between the ball joint hinge apparatus and a square tube constituting the floating photovoltaic panel installation structure according to an embodiment of the present disclosure.
Figure 13:
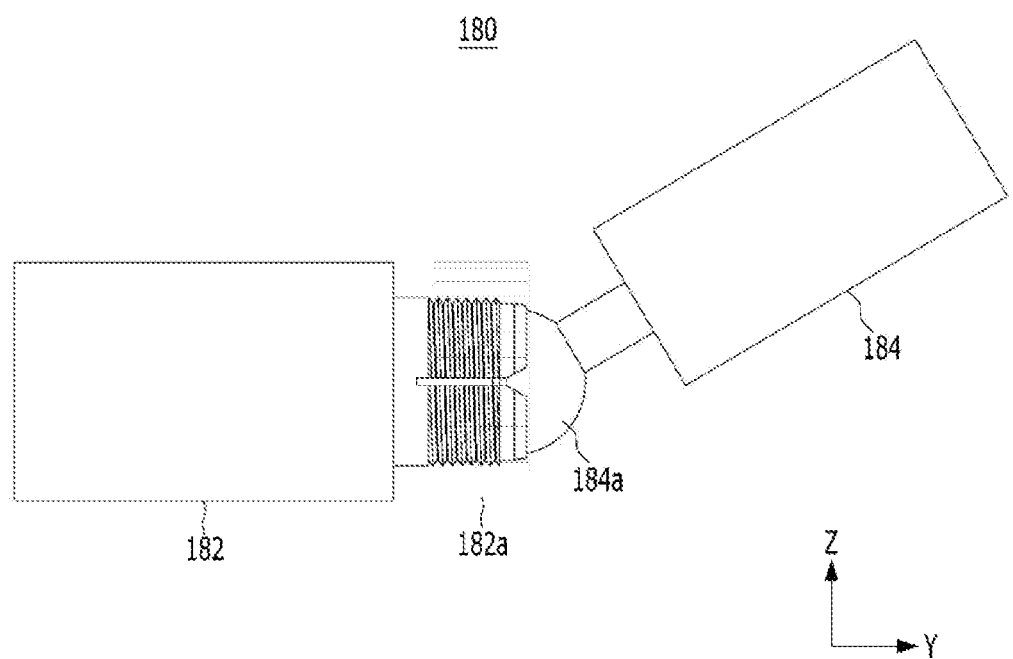
FIGS. 13 and 14 are side diagrams for explaining an operation of the ball joint hinge apparatus constituting the floating photovoltaic panel installation structure according to an embodiment of the present disclosure.
Figure 14:
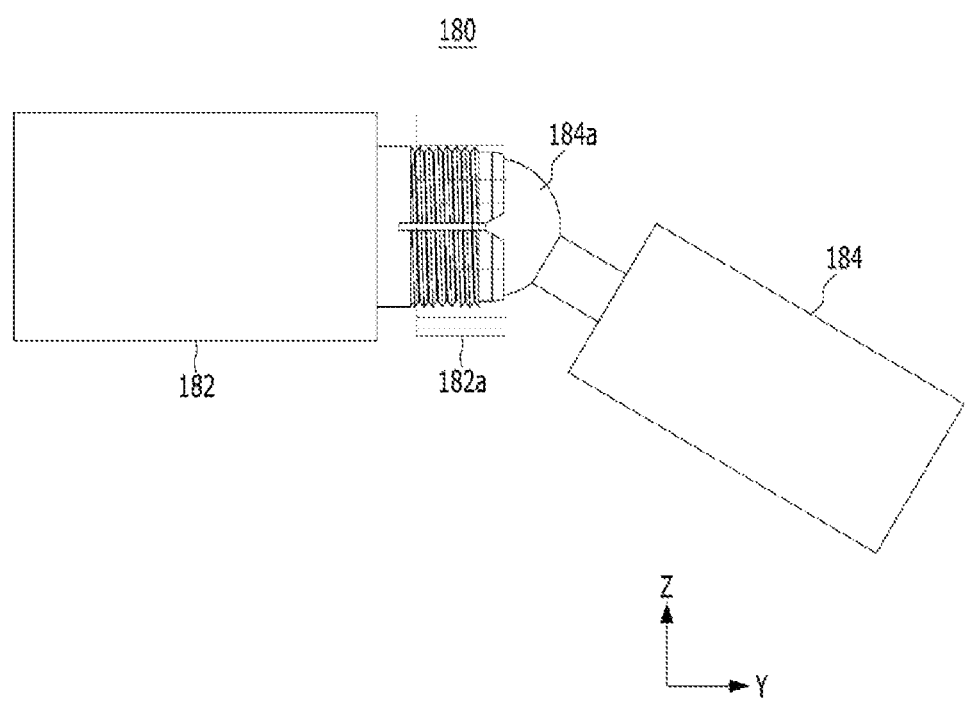
Figure 15:
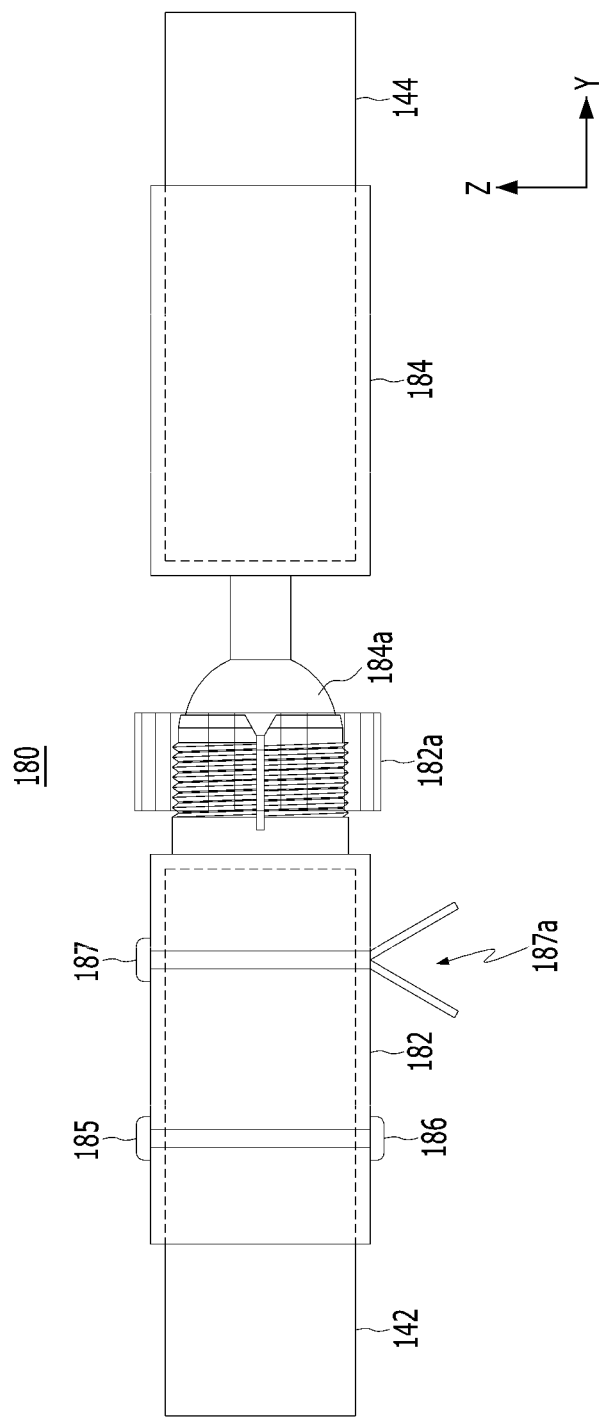
FIG. 15 is a side diagram for explaining an operation of the ball joint hinge apparatus constituting the floating photovoltaic panel installation structure according to an embodiment of the present disclosure.

FIG. 10 is a perspective diagram of a ball joint hinge apparatus constituting the floating photovoltaic panel installation structure according to an embodiment of the present disclosure. FIG. 11 is a partial perspective diagram of the ball joint hinge apparatus constituting the floating photovoltaic panel installation structure according to an embodiment of the present disclosure. FIG. 12 is a perspective diagram for explaining the connection between the ball joint hinge apparatus and a square tube constituting the floating photovoltaic panel installation structure according to an embodiment of the present disclosure. FIGS. 13 and 14 are side diagrams for explaining an operation of the ball joint hinge apparatus constituting the floating photovoltaic panel installation structure according to an embodiment of the present disclosure. FIG. 15 is a side diagram for explaining the connection between the ball joint hinge apparatus and a square tube constituting the floating photovoltaic panel installation structure according to an embodiment of the present disclosure.

Referring to FIGS. 1, 2, and 10 to 15, in order to stably support the photovoltaic panel during the occurrence of the movement due to waves, adjacent unit floating type structures 100, 100' may be connected to each other in a joint structure by the ball joint hinge apparatuses 180 of an engineering plastic material connected to the end portions of the square tubes 142, 144. In an embodiment, the ball joint hinge apparatus 180 may include a first joint member 182 coupled to any one of the square tubes 142, 144 in the adjacent unit floating type structures 100, 100', and a second joint member 184 coupled to the other square tube in the adjacent unit floating type structures 100, 100'. Referring to FIGS. 12 to 15, the first joint member 182 and the second joint member 184 may be formed with one or more through holes (H1 to H8) to which the end portions of the square tubes 142, 144 may be coupled, may be used with a bolt 185 and a nut 187 such as a split beam locknut, a modified threaded nut, an inclined threaded nut, a nylok pellet, a lock collar, a friction ring nut, a nylon patch, a castle nut, a jam nut, and a saw tooth surface nut, in order to prevent the bolt from being loosened. The nut 187 may also be formed in a shape of a wedge having an end portion 187a opened.

The first joint member 182 may have a link coupling part 182c having a hemispherical groove 182b. A spherical ball member 184a formed at the distal end of the second joint member 184 may be accommodated in the groove 182b of the first joint member 182. The ball member 184a may be accommodated so as not to be separated from the groove 182b by a fastening part 182a fastened to the link coupling part 182c in a state that is accommodated in the groove 182b. In an embodiment, the ball joint link 180 may be provided as a connection part in a joint form of a plastic or engineering plastic material such as polyamide or Ultra High Molecular Weight Polyethylene (UHMW-PE).

Meanwhile, the bodies of the first joint member 182 and the second joint member 184 according to the present embodiment may be formed with a coupling groove to have the cross section formed in a rectangular shape to correspond to the square tubes 142, 144 formed in a cross-sectional square so that the square tubes 142, 144 may be coupled to each other. Further, the bodies of the first joint member 182 and the second joint member 184 may be formed with the through holes (H1 to H8) through which the fastening member for fastening the square tubes 142, 144 to the bodies of the first joint member 182 and the second joint member 184 penetrates.

According to an embodiment of the present disclosure, as illustrated in FIGS. 12 and 13, the angle between the first joint member 182 and the second joint member 184 of the ball joint links 180 may be freely and smoothly, adjusted during the occurrence of the movement due to the waves, such that as the angle between the unit floating type structures 100, 100' is flexibly adjusted, the stable support state of the photovoltaic panel support structure 140 and the photovoltaic panel 160 may be maintained.

Figure 16:
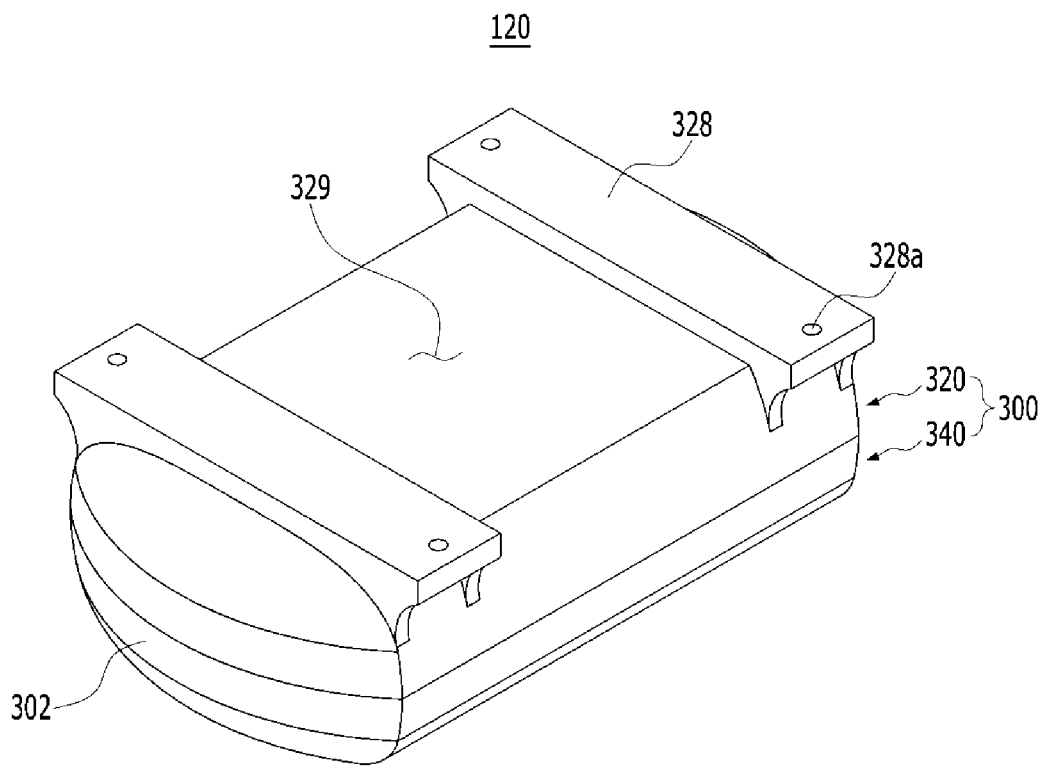
FIG. 16 is a perspective diagram of a buoyancy body for the installation of a floating photovoltaic panel according to another embodiment of the present disclosure.
Figure 17:
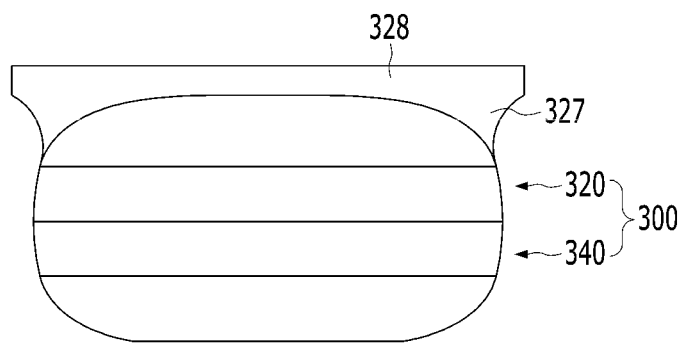
FIG. 17 is a side diagram of the buoyancy body for the installation of the floating photovoltaic panel in FIG. 16.
Figure 18:
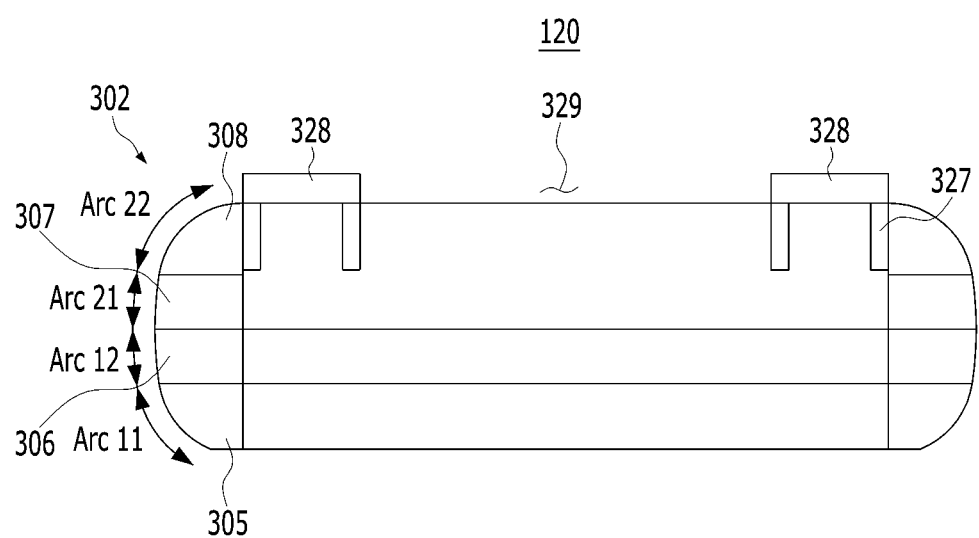
FIG. 18 is a front diagram of the buoyancy body for the installation of the floating photovoltaic panel in FIG. 16.
Figure 19:
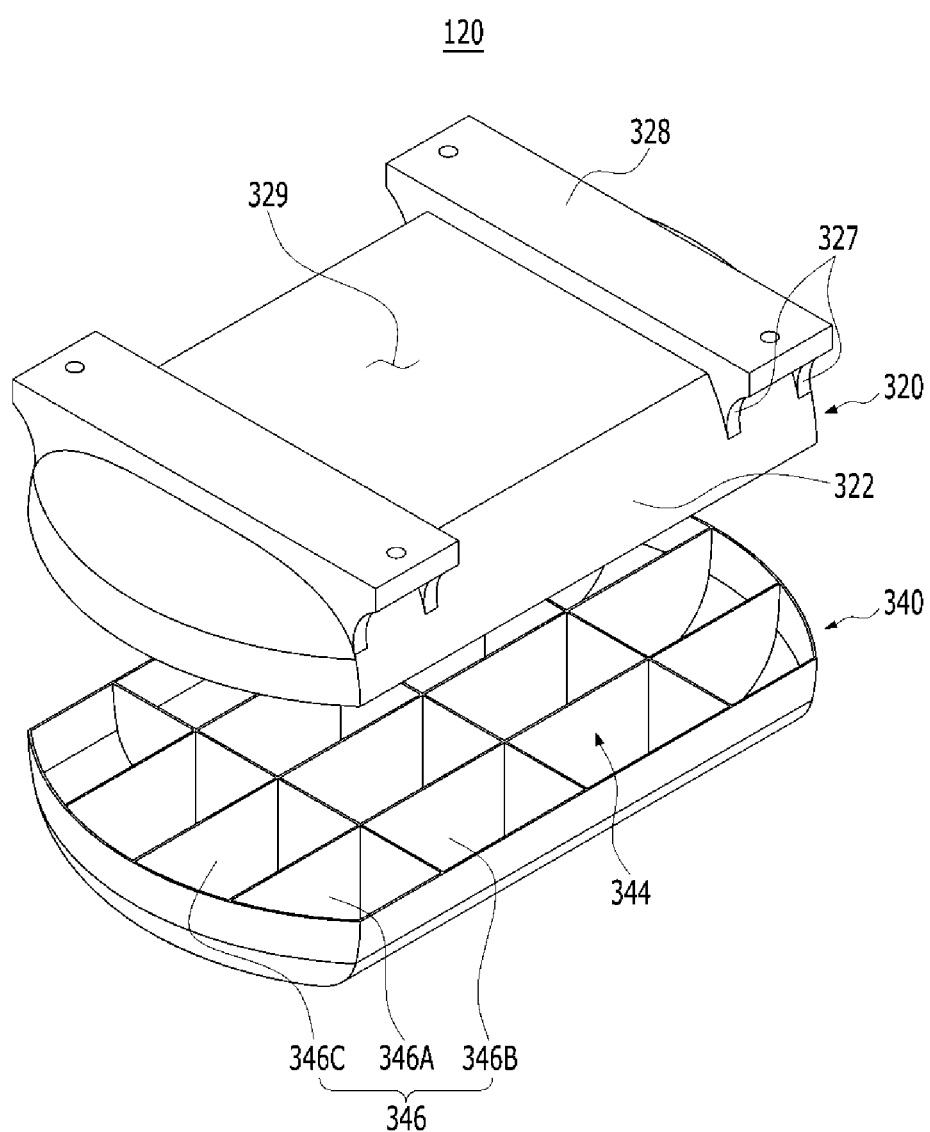
FIGS. 19 and 20 are exploded perspective diagrams of the buoyancy body for the installation of the floating photovoltaic panel in FIG. 16.
Figure 20:
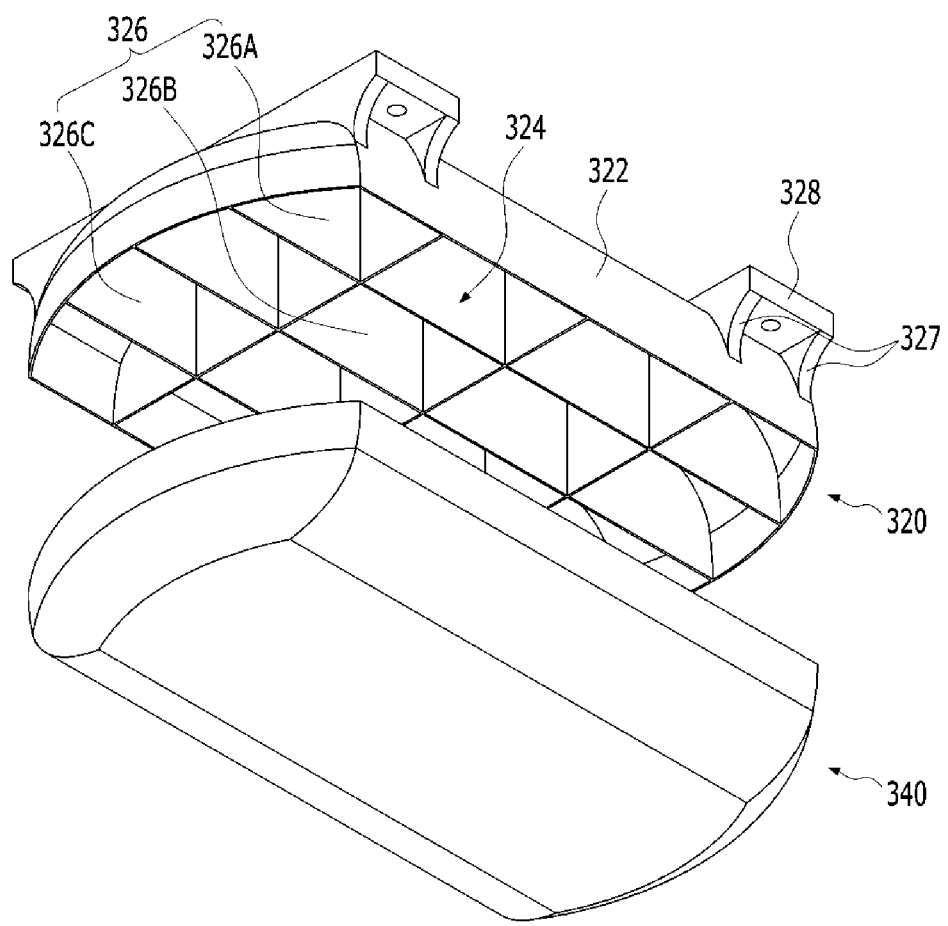

FIG. 16 is a perspective diagram of a buoyancy body for the installation of a floating photovoltaic panel according to another embodiment of the present disclosure. Further, FIG. 17 is a side diagram of the buoyancy body for the installation of the floating photovoltaic panel in FIG. 16, and FIG. 18 is a front diagram of the buoyancy body for the installation of the floating photovoltaic panel in FIG. 16. Further, FIGS. 19 and 20 are exploded perspective diagrams of the buoyancy body for the installation of the floating photovoltaic panel in FIG. 16.

The present embodiment differs only in the shape of the buoyancy body, and other configurations are the same as those of the buoyancy body of FIGS. 1 to 16, such that the characteristic parts of the present embodiment will be mainly described below.

Referring to FIGS. 16 to 20, the buoyancy body 120 includes a cylindrical body 300 formed to be rounded, and the body 300 includes an upper structure 320 and a lower structure 340.

Both side surfaces 302 of the body 300 have a curvature radius changed with the height, and both side surfaces 302 have a first lower area 305, a second lower area 306, a first upper area 307, and a second upper area 308 formed in order from the lower side to the upper side.

The first lower area 305 is formed in an arc shape having a first lower curvature radius (Arc11), and the second lower area 306 is formed in an arc shape having a second lower curvature radius (Arc12). Further, the first upper area 307 is formed in an arc shape having a first upper curvature radius (Arc21), and the second upper area 308 is formed in an arc shape having a second upper curvature radius (Arc22).

At this time, the first lower area 305 and the second lower area 306 are formed as the lower structure 340, and the first upper area 307 and the second upper area 308 are formed as the upper structure 320.

The first lower curvature radius (Arc11) and the second upper curvature radius (Arc22) are formed to be the same, and the second lower curvature radius (Arc12) and the first upper curvature radius (Arc21) are formed to be the same. Further, the first lower curvature radius (Arc11) and the second upper curvature radius (Arc22) are formed to be smaller than the second lower curvature radius (Arc12) and the first upper curvature radius (Arc21). That is, the first lower area 305 positioned at the lowermost end side of both side surfaces 302, 304 of the body 300 and the second upper area 308 positioned at the uppermost end side thereof may be formed to be further rounded than the second lower area 306 and the first upper area 307, which are positioned at the middle side of both side surfaces 302, 304. Further, according to the shape, the upper structure 320 and the lower structure 340 may be formed to have a shape that is symmetrical to each other. That is, it is possible to manufacture the upper structure 320 and the lower structure 340 by using one mold, thereby further enhancing the manufacturing efficiency.

Meanwhile, a pair of coupling plates 328 is disposed above the upper structure 320. The pair of coupling plates 328 are spaced apart from each other in the first direction (X), and a spacing space 329 is formed between the coupling plates 328.

The coupling plate 328 is formed to lengthily extend in a direction perpendicular to the first direction (X), and coupling holes 328a for stably fixing the photovoltaic panel support structure 140 are penetrated and formed at both ends of the coupling plate 328.

Further, both end portions of the coupling plate 328 is spaced apart from the outer circumference surface of the body 300 by the curvature of the body 300, and fixing reinforced parts 327 for connecting the outer circumference surface of the body 300 and the coupling plate 328 so that the coupling plate 328 is fixed to the body 300 more firmly are formed below both end portions of the coupling plate 328.

In the present embodiment, the coupling plate 328 may be prepared in pair and the coupling plate 328 may be provided only at the coupling position with the photovoltaic panel support structure 140, thereby reducing the overall weight of the buoyancy body 120.

Meanwhile, a plurality of upper compartments 326 partitioned by upper lattices 324 are formed inside the upper structure 320, and a plurality of lower compartments 346 partitioned by lower lattices 344 are formed inside the lower structure 340.

The upper compartment 326 includes first upper compartments 326A and third upper compartments 326C adjacent to both side surfaces 302, 304 side of the body 300, and second upper compartments 326B disposed between the adjacent first upper compartments 326A and third upper compartments 326C, that is, at the middle side of the upper compartment 326. At this time, the first upper compartments 326A are positioned outside the upper structure 320 and the third upper compartments 326C are positioned relatively inside the upper structure 320. Due to the curvature shapes of both side surfaces 302, 304, the first upper compartments 326A and the third upper compartments 326C may have one sides formed to be rounded, the volume of the third upper compartment 326C is formed to be the largest, and the volume of the second upper compartment 326B is formed to be the smallest.

Likewise, the lower compartments 346 partitioned by the lower lattices 344 are formed inside the lower structure 340, and the lower compartments 346 include first lower compartments 346A, second lower compartments 346B, and third lower compartments 346C corresponding to and mutually contacting the first upper compartments 326A, the second upper compartments 326B, and the third upper compartments 326C.

In the present embodiment, a first air pocket by the first compartments 326A, 346A and a third air pocket by the third compartments 326C, 346C having a relatively large volume with respect to the first direction (X) may be disposed on both side surfaces of the body 300, and a second air pocket by the second compartments 326B, 346B may be disposed between them, thereby providing more stable buoyancy. Further, the third air pocket by the third compartments 326C, 346C having a relatively large volume with respect to the second direction (Y) may be disposed between the first air pockets by the first compartments 326A, 346A having a relatively small volume, thereby providing buoyancy to the body 300 more stably.

Figure 21:
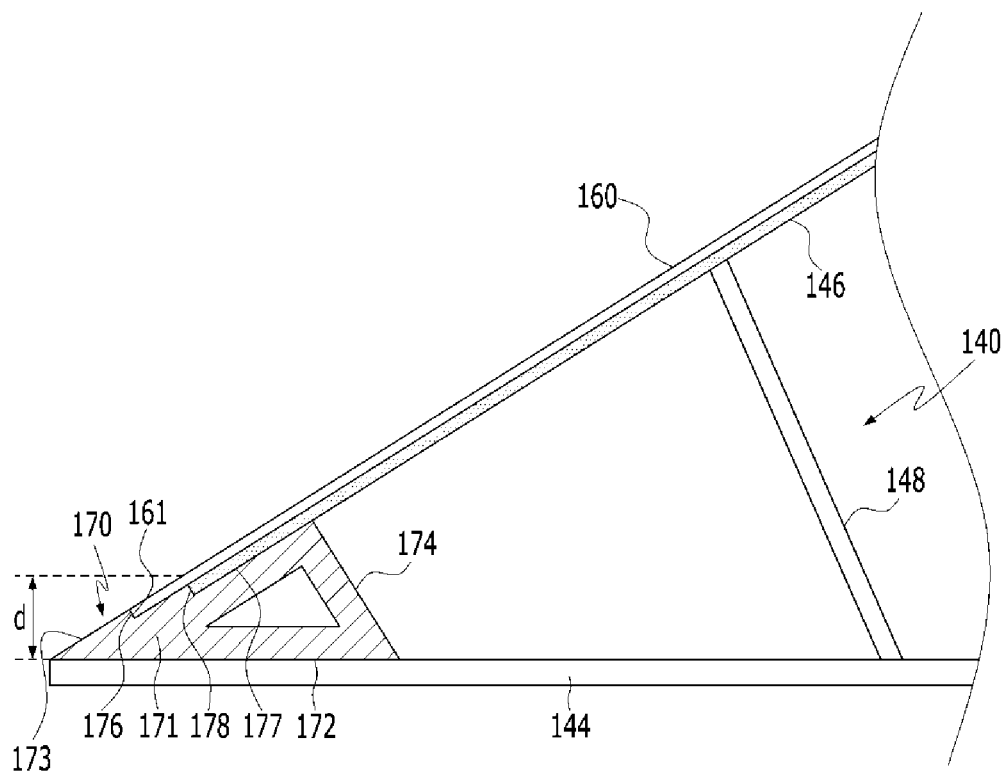
FIGS. 21 and 22 are diagrams illustrating the function of a triangular bracket in a floating photovoltaic panel installation structure according to still another embodiment of the present disclosure.
Figure 22:
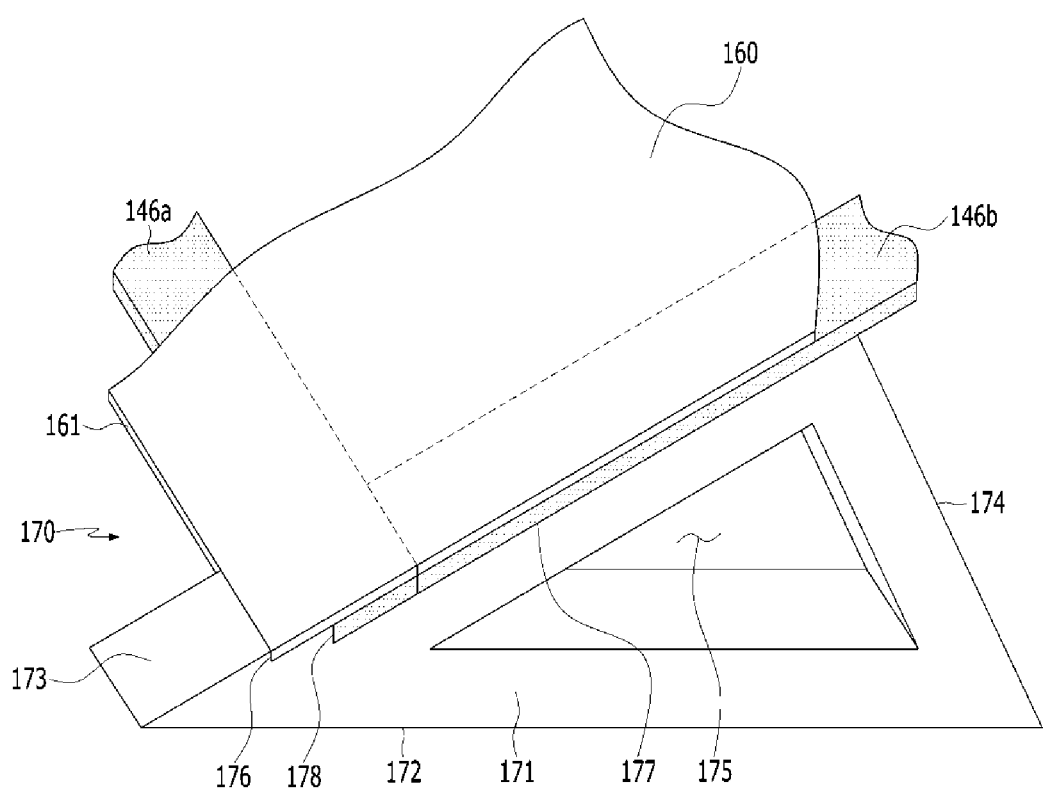

FIGS. 21 and 22 are diagrams illustrating a portion of a floating photovoltaic panel installation structure according to still another embodiment of the present disclosure. Here, FIG. 21 is a side diagram illustrating an enlarged portion of the floating photovoltaic panel installation structure, and FIG. 22 is a perspective diagram of the floating photovoltaic panel installation structure in FIG. 21.

The present embodiment differs only in some configurations of the photovoltaic panel installation structure, and other configurations are the same as those of the photovoltaic panel installation structure in FIGS. 1 to 16, such that the characteristic parts of the present disclosure will be mainly described below.

Referring to FIGS. 21 and 22, one side of the photovoltaic panel support structure 140 according to an embodiment of the present disclosure adjacent to the end portion of the photovoltaic panel supporter 146 is installed with a fixing frame 148 for fixing the photovoltaic panel supporter 146 with respect to the second square tube 144. The end portion of the photovoltaic panel supporter 146 having one side mounted on the fixing frame 148 is positioned at a position spaced upwards by a predetermined spacing distance (d) apart from the second square tube 144, and the photovoltaic panel 160 installed on the photovoltaic panel supporter 146 is also positioned to be spaced upwards by the spacing distance (d) apart from the second square tube 144.

According to the present embodiment, in the process of installing and operating the floating photovoltaic panel installation structure on the water, as the photovoltaic panel 160 is disposed to be spaced upwards by the spacing distance (d) apart from the second square tube 144 forming the support surface, an external force such as waves may be suppressed from being operated.

However, if the end portion of the photovoltaic panel 160 is disposed to be spaced by the spacing distance (d) apart from the second square tube 144, the support of the photovoltaic panel 160 to the photovoltaic panel installation structure 140 may become unstable.

Accordingly, the photovoltaic panel installation structure 140 according to the present embodiment further includes the triangular bracket 170 for stably supporting the end portion 161 of the photovoltaic panel 160 with respect to the second square tube 144.

The triangular bracket 170 may have the vertical directional cross section formed in a substantially triangular shape, and the cross section of the triangular bracket 170 may be, for example, a right triangle.

The triangular bracket 170 includes, for example, a support bracket body 171 made of a light, corrosion-resistant plastic material, such as Polyethylene or Waste Carbon Fiber Reinforced Plastics, and the support bracket body 171 is formed with a first surface 172 forming the lower surface rim of the support bracket body 171, a second surface 173 forming the front side rim of the support bracket body 171 and supporting the photovoltaic panel supporter 146 and the end portion of the photovoltaic panel 160, and a third surface 174 forming the rear side rim of the support bracket body 171.

The first surface 172 has the largest area, the third surface 174 has the smallest area, and the area of the second surface 173 is formed to be larger than the area of the first surface 172 and smaller than the area of the third surface 174. That is, the first surface 172 having the largest area contacts the second square tube 144 so that the triangular bracket 170 may be supported with respect to the second square tube 144 more stably.

A portion of the second surface 173 is a recess 177 recessed by a predetermined depth and having the photovoltaic panel supporter 146 and the end portion of the photovoltaic panel 160 seated thereon, and one end of the recess 177 is formed with a first stopper 176 and a second stopper 178 in which the end portion 161 of the photovoltaic panel 160 and the photovoltaic panel supporter 146 are locked, respectively and their seated positions are maintained.

Further, fastening holes (not illustrated) may be formed in the recess 177, and a fastening member penetrating the photovoltaic panel supporter 146 and the photovoltaic panel 160 may be fixed to the fastening holes, thereby supporting the photovoltaic panel 160 more stably.

Further, the end portion 161 of the photovoltaic panel 160 and the end portion of the photovoltaic panel supporter 146 may be locked to the first stopper 176 and the second stopper 178 formed at one side of the recess 177, thereby supporting the photovoltaic panel 160 more firmly. In the present embodiment, the end portion 161 of the photovoltaic panel 160 is formed to extend longer than the end portion of the photovoltaic panel supporter 146, and the end portion 161 of the photovoltaic panel 160 and a portion of the lower surface of the photovoltaic panel 160 are seated and supported on the triangular bracket 170.

At this time, the recessed depth of the recess 177 is formed to be larger than the sum of the thickness of the photovoltaic panel supporter 146 and the thickness of the photovoltaic panel 160, and formed to be smaller than twice the sum of the thickness of the photovoltaic panel supporter 146 and the thickness of the photovoltaic panel 160.

Further, the side surface of the triangular bracket body 171 is formed with a triangular bracket side through hole 175 in a direction parallel to the plane in which the first surface 172, the second surface 173, and the third surface 174 are formed, that is, at the side of the triangular bracket body 171. The triangular bracket side through hole 175 may be formed to have a shape corresponding to the triangular bracket body 171, and formed to have a shape reduced at a predetermined ratio with respect to the shape of the triangular bracket body 171.

The triangular bracket side through hole 175 is formed to have a reduced shape with respect to the shape of the triangular bracket body 171 to constantly form the thickness of the triangular bracket body 171 on which the first surface 172, the second surface 173, and the third surface 174 are positioned, thereby properly distributing the load applied to the triangular bracket 170.

Further, as a portion of the triangular bracket 170 is penetrated and formed, the weight may be reduced, and when an external force due to waves or wind is applied to the side surface side of the triangular bracket 170, the side surface of the triangular bracket 170 may not resist the external force, and the external force may pass the triangular bracket side through hole 175, thereby increasing the stability against the external force.

Although the preferred embodiments of the present disclosure have been described above, the present disclosure is not limited thereto, and may be modified variously within the scope of the claims, the detailed description of the disclosure, and the accompanying drawings and it is natural that this also belongs to the scope of the present disclosure.

What is claimed is:

1. A floating photovoltaic panel installation structure comprising at least one unit floating type structure for supporting a photovoltaic panel on the water,
   wherein the unit floating type structure comprises:
   a plurality of buoyancy bodies arranged to be spaced apart from each other;
   a photovoltaic panel support structure supported on the plurality of buoyancy bodies;
   a triangular bracket for supporting the photovoltaic panel support structure supported on the plurality of buoyancy bodies;
   a ball joint hinge apparatus for connecting one of the plurality of buoyancy bodies to another; and
   at least one photovoltaic panel supported by the photovoltaic panel support structure,
   wherein at least one buoyancy body among the plurality of buoyancy bodies is made of a material in which Polyethylene and Waste Carbon Fiber Reinforced Plastics have been blended,
   wherein the at least one buoyancy body among the plurality of buoyancy bodies comprises a cylindrical body, and
   wherein the photovoltaic panel installation structure further comprises a panel supporter supported on square tubes to support the photovoltaic panel and disposed to be inclined on the square tubes, and a support bracket disposed between any one square tube among the square tubes and an end portion of the panel supporter to support the end portion of the panel supporter in a state that is spaced by a certain distance apart from the square tube,
   wherein the support bracket comprises a support bracket body having a vertical directional cross section formed in a triangular shape,
   wherein the support bracket body is formed with a first surface forming a lower surface rim of the support bracket body, a second surface forming a front side rim of the support bracket body and supporting the photovoltaic panel supporter and the end portion of the photovoltaic panel, and a third surface forming a rear side rim of the support bracket body, wherein an area of the first surface is formed to be larger than an area of the second surface, and an area of the second surface is formed to be larger than an area of the third surface.

2. The floating photovoltaic panel installation structure of claim 1,
wherein the Waste Carbon Fiber Reinforced Plastics comprises a waste generated in a process of manufacturing Carbon Fiber Reinforced Plastics.

3. The floating photovoltaic panel installation structure of claim 1,
wherein the at least one buoyancy body comprises 20 to 80 wt % of the Polyethylene, 20 to 80 wt % of the Waste Carbon Fiber Reinforced Plastics, and 3 wt % or more of an ultraviolet shielding agent.

4. The floating photovoltaic panel installation structure of claim 1,
wherein the at least one buoyancy body comprises a High Density Polyethylene having the density of 930 to 970 kg/m3, a Low Density Polyethylene having the density of 915 to 925 kg/m3, a Linear Low Density Polyethylene, and the Waste Carbon Fiber Reinforced Plastics, and provides buoyancy of 10 times or more relative to the weight of the buoyancy body.

5. The floating photovoltaic panel installation structure of claim 1,
wherein the cylindrical body has an upper structure and a lower structure fused to be coupled with each other and extending along a first direction,
wherein the upper structure comprises:
an upper body having a semi-cylindrical shape a top of which is truncated, and having an internal space partitioned into upper compartments having a lattice structure by upper lattices; and
a coupling plate formed integrally above the upper body, and for coupling with the photovoltaic panel support structure,
wherein the lower structure comprises a lower body having a semi-cylindrical shape with the lower surface curved and having the internal space partitioned into lower compartments to have the lattice structure by lower lattices, and
wherein the cylindrical body is formed with a plurality of air pockets having a lattice structure in the internal space by the upper compartments and the lower compartments.

6. The floating photovoltaic panel installation structure of claim 5,
wherein the square tubes are made of a corrosion-resistant metal material disposed on the plurality of buoyancy bodies and the triangular bracket,
wherein the coupling plate is extended to be protruded from both side edges of the upper surface of the upper body toward the outside, and the upper surface of the coupling plate is formed to have a flat surface, and
wherein coupling holes for coupling at least one square tube among the square tubes are penetrated and formed on the edge portion of the coupling plate expanding from the upper body to the outside.

7. The floating photovoltaic panel installation structure of claim 6,
wherein the at least one square tube among the square tubes and the triangular bracket are made of a material in which the Polyethylene and the Waste Carbon Fiber Reinforced Plastics have been blended.

8. The floating photovoltaic panel installation structure of claim 6, comprising the unit floating type structure in plural,
wherein in order to stably support the photovoltaic panel against movement of waves, adjacent unit floating type structures are connected in a joint structure by the ball joint hinge apparatus of a plastic material connected to the end portions of the square tubes.

9. The floating photovoltaic panel installation structure of claim 5,
wherein both side surfaces of the cylindrical body with respect to the first direction have a convex shape protruded from the cylindrical body to the outside, and the both side surfaces of the cylindrical body have a curvature radius changed with a height, and
wherein a lower area comprising a portion positioned below a water surface of the both side surfaces of the cylindrical body has a first arc shape having a first curvature radius, and an upper area higher than the lower area of the both side surfaces has a second arc shape having a second curvature radius smaller than the first curvature radius.

10. The floating photovoltaic panel installation structure of claim 5,
wherein both side surfaces of the cylindrical body with respect to the first direction have a convex shape protruded from the cylindrical body to the outside, and the both side surfaces of the cylindrical body have a curvature radius changed with a height,
wherein the both side surfaces of the cylindrical body have a first lower area, a second lower area, a first upper area, and a second upper area in order disposed thereon from the lowermost end of the cylindrical body to an uppermost end thereof,
wherein the curvature radiuses of the first lower area and the second upper area are formed to be smaller than the curvature radiuses of the second lower area and the first upper area,
wherein the curvature radius of the first lower area and the curvature radius of the second upper area are the same as each other, and
wherein the curvature radius of the second lower area and the curvature radius of the first upper area are the same as each other.

11. The floating photovoltaic panel installation structure of claim 5,
wherein the air pocket of the cylindrical body comprises a first air pocket, a second air pocket, and a third air pocket formed to have different volumes from each other, and
wherein an air pocket having a largest volume and air pockets having a next largest volume among the first air pocket, the second air pocket, and the third air pocket are disposed on both side surfaces of the cylindrical body with respect to the first direction, and air pockets having the smallest volume are disposed at a middle side of the cylindrical body.

12. The floating photovoltaic panel installation structure of claim 1,
wherein the second surface is formed with a recess recessed by a predetermined depth and having the photovoltaic panel supporter and the end portion of the photovoltaic panel seated thereon, and one end of the recess is formed with a stopper in which the photovoltaic panel supporter and the end portion of the photovoltaic panel are locked and their seated positions are maintained.

\* \* \* \* \*